(12) United States Patent
Carnes et al.

(10) Patent No.: US 6,582,817 B2
(45) Date of Patent: *Jun. 24, 2003

(54) NONWOVEN FABRICS FORMED FROM POLYETHYLENE GLYCOL MODIFIED POLYESTER FIBERS AND METHOD FOR MAKING THE SAME

(75) Inventors: Keith James Carnes, Concord, NC (US); James Burch Branum, Fort Mill, SC (US)

(73) Assignee: Wellman, Inc., Shrewsbury, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/761,446

(22) Filed: Jan. 17, 2001

(65) Prior Publication Data

US 2001/0039160 A1 Nov. 8, 2001

Related U.S. Application Data

(63) Continuation-in-part of application No. 09/484,822, filed on Jan. 18, 2000, which is a continuation-in-part of application No. 09/444,192, filed on Nov. 19, 1999.

(51) Int. Cl.[7] .............................. D02G 3/00; C08F 20/00
(52) U.S. Cl. ...................... 428/365; 525/437; 525/444; 428/359; 428/364; 428/370; 264/177.13; 424/443; 604/358; 604/367
(58) Field of Search ................................. 525/437, 444; 428/359, 364, 365, 370; 264/177.13; 424/443

(56) References Cited

U.S. PATENT DOCUMENTS

| | | | |
|---|---|---|---|
| 2,623,031 A | 12/1952 | Snyder | |
| 2,744,087 A | 5/1956 | Snyder | |
| 3,576,773 A | 4/1971 | Vaginay | |
| 3,683,921 A | 8/1972 | Brooks et al. | |
| 3,695,269 A | 10/1972 | Malaney | |

(List continued on next page.)

FOREIGN PATENT DOCUMENTS

| | | |
|---|---|---|
| EP | 0 595 185 A1 | 5/1994 |
| EP | 0 985 752 A | 3/2000 |
| GB | 2 021 652 A | 12/1979 |
| JP | 2-38421 A | 2/1990 |
| JP | 03174076 A | 7/1991 |
| JP | 04041732 A | 2/1992 |
| JP | 04041738 A | 2/1992 |
| JP | 05295673 A | 11/1993 |
| JP | 2808829 B2 | 10/1998 |
| JP | 2932614 B2 | 8/1999 |
| RO | 82333 B | 9/1983 |
| RO | 83208 B | 1/1984 |
| TW | 353682 | 3/1999 |
| WO | WO 99/19548 A | 4/1999 |
| WO | WO 00/12793 A1 | 3/2000 |
| WO | WO 01/36722 A1 | 5/2001 |
| WO | WO 01/36723 A1 | 5/2001 |

Primary Examiner—Samuel A. Acquah
(74) Attorney, Agent, or Firm—Summa & Allan, P.A.

(57) ABSTRACT

Disclosed is a nonwoven fabric that is formed of polyethylene glycol modified copolyester staple fibers. The copolyester staple fibers include polyethylene terephthalate in an amount sufficient for the copolyester staple fibers to possess dimensional stability properties substantially similar to those of conventional, unmodified polyethylene terephthalate fibers, polyethylene glycol in an amount sufficient for the copolyester staple fibers to possess wicking characteristics that are superior to those of conventional, unmodified polyethylene terephthalate fibers, and chain branching agent in an amount less than about 0.0014 mole-equivalent branches per mole of standardized polymer. Also disclosed are methods for making such nonwoven fabrics.

99 Claims, 14 Drawing Sheets

U.S. PATENT DOCUMENTS

| | | |
|---|---|---|
| 3,775,373 A | 11/1973 | Wolfe, Jr. |
| 3,926,551 A | 12/1975 | Okada et al. |
| 4,002,171 A | 1/1977 | Taft |
| 4,035,441 A | 7/1977 | Endo et al. |
| 4,049,621 A | 9/1977 | Gilkey et al. |
| 4,092,299 A | 5/1978 | MacLean et al. |
| 4,113,704 A | 9/1978 | MacLean et al. |
| 4,167,395 A | 9/1979 | Engelhardt et al. |
| 4,207,230 A | 6/1980 | Bier et al. |
| 4,211,678 A | 7/1980 | Henry et al. |
| 4,548,856 A | 10/1985 | Ali Khan et al. |
| 4,587,154 A | 5/1986 | Hotchkiss et al. |
| 4,666,454 A | 5/1987 | DeMartino et al. |
| 4,704,329 A | 11/1987 | Hancock et al. |
| 4,705,525 A | 11/1987 | Abel et al. |
| RE32,741 E | 8/1988 | Miyoshi et al. |
| 4,785,060 A | 11/1988 | Nagler |
| 4,827,999 A | 5/1989 | Yabuki et al. |
| 4,925,722 A | 5/1990 | Jeffers et al. |
| 4,975,233 A | 12/1990 | Blaeser et al. |
| 4,983,450 A | 1/1991 | Yanagihara et al. |
| 5,009,651 A | 4/1991 | Kamishioiri et al. |
| 5,039,467 A | 8/1991 | Frazier |
| 5,064,599 A | 11/1991 | Ando et al. |
| 5,089,533 A | 2/1992 | Park |
| 5,089,553 A | 2/1992 | Umeda et al. |
| 5,091,504 A | 2/1992 | Blaeser et al. |
| 5,097,004 A | 3/1992 | Gallagher et al. |
| 5,114,788 A | 5/1992 | Nakagawa et al. |
| 5,171,308 A | 12/1992 | Gallagher et al. |
| 5,171,309 A | 12/1992 | Gallagher et al. |
| 5,178,945 A | 1/1993 | Kawamoto et al. |
| 5,223,317 A | 6/1993 | Corbin et al. |
| 5,234,720 A | 8/1993 | Neal et al. |
| 5,295,985 A | 3/1994 | Romesser et al. |
| 5,403,426 A | 4/1995 | Johnson et al. |
| 5,498,478 A | 3/1996 | Hansen et al. |
| 5,552,513 A | 9/1996 | Bhatia |
| 5,652,057 A | 7/1997 | Delker |
| 5,677,058 A | 10/1997 | Neal et al. |
| 5,709,940 A | 1/1998 | George et al. |
| 5,750,256 A | 5/1998 | Ito et al. |
| 5,807,796 A | 9/1998 | Degrand et al. |
| 5,820,973 A | 10/1998 | Dodge, II et al. |
| 5,834,582 A | 11/1998 | Sinclair et al. |
| 5,879,343 A | 3/1999 | Dodge, II et al. |
| 5,902,539 A | 5/1999 | Schmidt et al. |
| 5,939,516 A | 8/1999 | Greaves et al. |
| 5,976,694 A | 11/1999 | Tsai et al. |
| 5,994,615 A | 11/1999 | Dodge, II et al. |
| 6,261,686 B1 | 7/2001 | Schumann |
| 6,291,066 B1 | 9/2001 | Branum |
| 6,294,254 B1 | 9/2001 | Nichols et al. |
| 6,303,739 B2 | 10/2001 | Branum |
| 6,322,886 B2 | 11/2001 | Branum |
| 6,399,705 B2 | 6/2002 | Branum |
| 2001/0039160 A1 | 11/2001 | Carnes et al. |

Intrinsic Viscosity vs. PEG

Figures 3
100% Polyester Fabric Strength
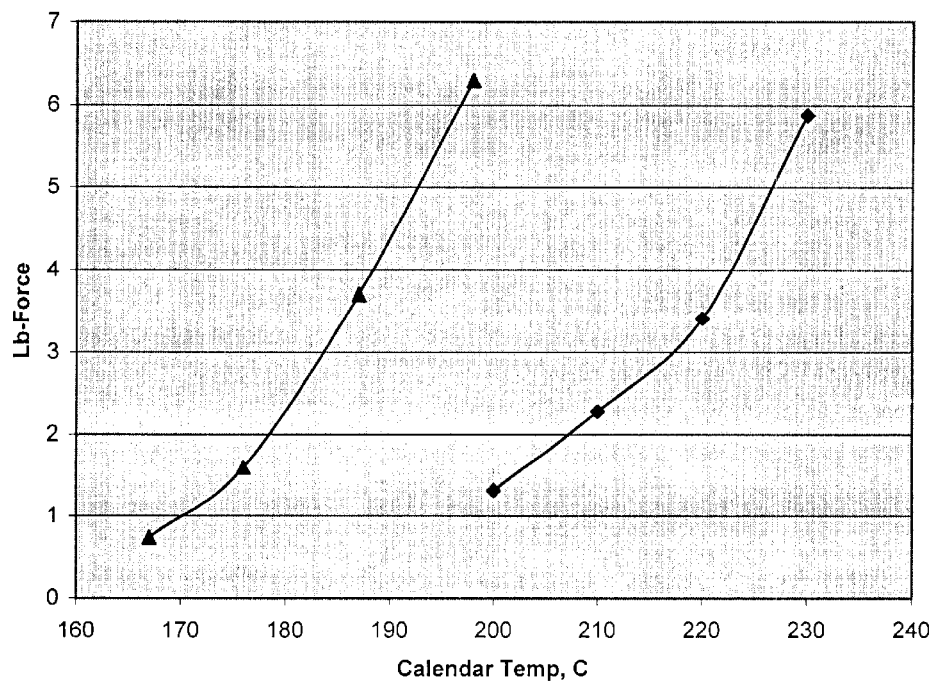
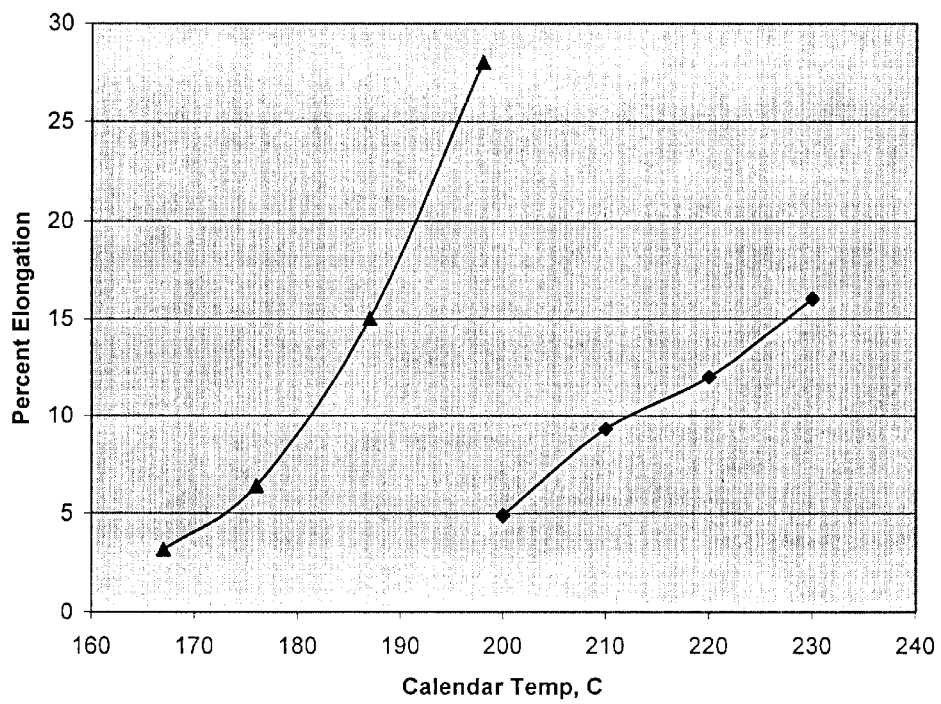
Figure.4

Figures 5
100% Polyester Fabric Strength
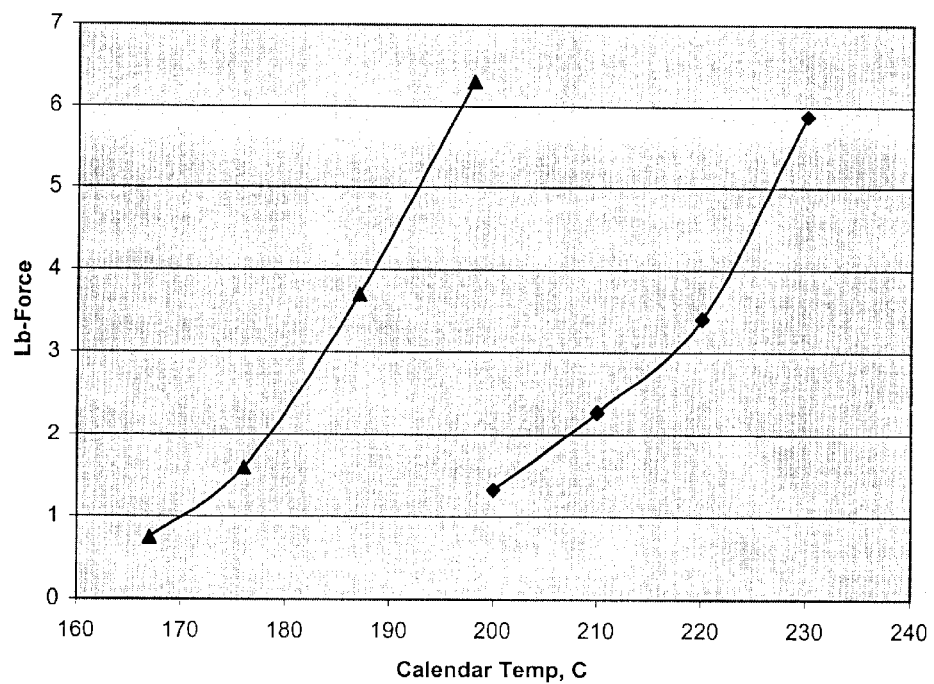
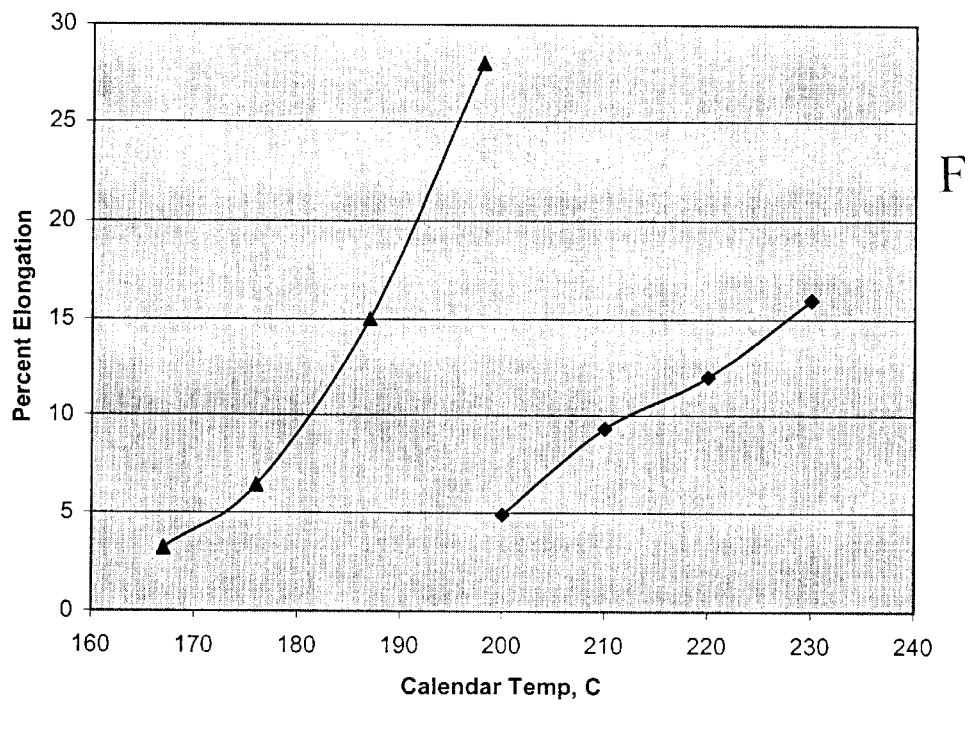
Figure.6
— ◆ — 0% PEG  — ▲ — 10% PEG An Exemplary Dye Cycle

NONWOVEN FABRICS FORMED FROM POLYETHYLENE GLYCOL MODIFIED POLYESTER FIBERS AND METHOD FOR MAKING THE SAME

CROSS-REFERENCE TO RELATED APPLICATIONS

This application is a continuation-in-part of application Ser. No. 09/484,822, filed Jan. 18, 2000, for Polyethylene Glycol Modified Polyester Fibers and Method for Making the Same, now U.S. Pat. No. 6,291,066, which itself is a continuation-in-part of pending application Ser. No. 09/444,192, filed Nov. 19, 1999, for a Method of Preparing Polyethylene Glycol Modified Polyester Filaments, now U.S. Pat. No. 6,454,982. Each of these applications is commonly assigned with this application and is hereby incorporated entirely herein by reference.

FIELD OF THE INVENTION

The present invention relates to nonwoven fabrics having exceptional moisture management characteristics. The present invention also relates to the manufacture of such nonwoven fabrics from polyethylene glycol modified copolyester staple fibers.

BACKGROUND OF THE INVENTION

Disposable diapers and other personal care products formed of nonwoven, synthetic fabrics are extremely popular. In fact, disposable diapers made of such nonwoven fabrics have now essentially replaced cloth diapers in the marketplace. This is so not only because nonwoven fabrics offer an attractive cost structure, but also because nonwoven fabrics provide superior performance. For example, continued enhancements to nonwoven fabrics include weight reduction, aesthetic improvements, and, of particular relevance to diapers, increases in the number of uses an article can endure before requiring disposal.

For many years, synthetic fibers, particularly polyester fibers, have been a major component in nonwoven fabrics for disposable personal care products. Such man-made fibers are cost-effective, strong, and are readily modifiable to deliver a range of desirable properties. For example, denier, crimp, cut length, polymer chemistry, and fiber finish chemistry can all be modified to meet specific end-use requirements. In this regard, coarser deniers are used to increase bulk, cut length can be optimized for various web formation techniques, and fiber finishes are modified to offer processing advantages, as well as end-use performance.

As is known by those familiar with personal care products, a primary function of the nonwoven surge layer in diapers is to move moisture from its source to a highly absorbent core. This allows the fabric surface that is in contact with skin to remain essentially dry and be available to accept more moisture. This increases the duration that a product can be used before disposal. Surge layers are often chemically treated to facilitate this kind of moisture movement. Such treatments, however, are typically inadequate to permit multiple uses, which the marketplace demands for diapers. Consequently, the optimization of the specific diaper construction, including the incorporation of specific fibers and fabrics, is a major focus of research across the fiber, nonwovens, and personal products industries.

The use of nonwoven materials in personal care products is well known. In this regard, U.S. Pat. Nos. 5,879,343, 5,820,973, and 5,994,615, each of which is assigned to Kimberly-Clark Worldwide, Inc., disclose achieving favorable moisture transport properties in surge layers using synthetic fibers, as well as surge materials for disposable personal care products made by bonding fibrous webs. Similarly, U.S. Pat. No. 4,548,856, which is also assigned to Kimberly-Clark Worldwide, Inc., discloses a method for forming bulky, absorbent nonwoven fabrics that include thermoplastic fibers. These Kimberly-Clark patents are hereby incorporated entirely herein by reference.

Despite the advancements in technology, there remains a continuing need for nonwoven fabrics having improved moisture management properties. Research and development by Wellman, Inc. demonstrates that improved wicking may be achieved in copolyester fibers and fabrics by selectively incorporating polyethylene glycol.

For example, a PEG-modified copolyester composition and method for producing the same is disclosed by Nichols and Humelsine in commonly-assigned, pending U.S. patent application Ser. No. 09/141,665, filed Aug. 28, 1998, for Polyester Modified with Polyethylene Glycol and Pentaerythritol, now U.S. Pat. No. 6,294,254. U.S. patent application Ser. No. 09/141,665, which is incorporated entirely herein by reference, discloses a polyester composition that includes polyethylene terephthalate, polyethylene glycol in an amount sufficient to increase the wetting and wicking properties of a fiber made from the composition to a level substantially similar to the properties of cotton, but less than the amount that would reduce the favorable elastic memory properties of the polyester composition, and chain branching agent in an amount that raises the melt viscosity of the polyester composition to a level that permits filament manufacture under substantially normal spinning conditions. Including significant concentrations of branching agents to increase melt viscosity is sometimes undesirable, however, because branching agents promote cross-linking. This reduces filament strength, which can lead to processing failures.

Moreover, a method for achieving enhanced polyester fibers is described by Branum in commonly-assigned, pending U.S. patent application Ser. No. 09/444,192, filed Nov. 19, 1999, for a Method of Preparing Polyethylene Glycol Modified Polyester Filaments. U.S. patent application Ser. No. 09/444,192, which, as noted, is incorporated entirely herein by reference, describes copolymerizing polyethylene glycol, which typically makes up between about 4 percent and 20 percent by weight of the resulting copolyester, into polyethylene terephthalate in the melt-phase to a relatively low intrinsic viscosity (i.e., a viscosity that will not support filament spinning). The resulting PEG-modified polyester is then further polymerized in the solid phase until the copolyester is capable of achieving a melt viscosity sufficient to spin filaments. By introducing a solid state polymerization (SSP) step, this method reduces the need to add branching agents, such as pentaerythritol, to increase the melt-phase polymerization rate and thereby achieve an intrinsic viscosity that facilitates the spinning of filaments. U.S. patent application Ser. No. 09/444,192 explains that branching agents promote cross-linking, which can lead to relatively weaker textiles.

Furthermore, a related method for achieving enhanced polyester fibers is described by Branum in commonly-assigned, pending application Ser. No. 09/484,822, filed Jan. 18, 2000, for Polyethylene Glycol Modified Polyester Fibers and Method for Making the Same. U.S. patent application Ser. No. 09/484,822, which is a continuation-in-part of the aforementioned application Ser. No. 09/444,192 and, as noted, is also incorporated entirely herein by reference, describes copolymerizing polyethylene glycol and branching agent into polyethylene terephthalate in the melt-phase to form a copolyester composition having an intrinsic viscosity of at least about 0.67 dl/g. Thereafter, copolyester filaments can be spun from the copolyester composition.

The present invention applies this technology fairly to the field of nonwoven fabrics in order to achieve PEG-modified copolyester personal care products that possess exceptional moisture management characteristics. Moreover, such copolyester products may be formed at significantly lower calendar bonding temperatures.

OBJECT AND SUMMARY OF THE INVENTION

Accordingly, it is an object of this invention to provide a nonwoven fabric having exceptional moisture management characteristics. The nonwoven fabric is especially useful in absorbent, personal care products, such as wipes, absorbent undergarments (e.g., disposable diapers, training pants, and adult incontinence products) and feminine hygiene products (e.g., sanitary napkins). The nonwoven fabric may also be included in durable goods having the appearance, performance, and aesthetics of conventional textile goods.

The nonwoven fabric is formed of polyethylene glycol modified copolyester staple fibers, which include polyethylene terephthalate in an amount sufficient for the copolyester staple fibers to possess dimensional stability properties substantially similar to those of conventional, unmodified polyethylene terephthalate fibers, polyethylene glycol in an amount sufficient for the copolyester staple fibers to possess wicking characteristics that are superior to those of conventional, unmodified polyethylene terephthalate fibers, and chain branching agent in an amount less than about 0.0014 mole-equivalent branches per mole of standardized polymer.

It is also an objective of this invention to provide methods for forming the aforementioned nonwoven fabrics. One method includes copolymerizing polyethylene glycol into polyethylene terephthalate in the melt phase to form a copolyester composition, then further polymerizing the copolyester composition in the solid phase until the copolyester composition is capable of achieving a melt viscosity that facilitates the spinning of fibers. Another method includes copolymerizing polyethylene glycol and chain branching agent into polyethylene terephthalate in the melt phase to form a copolyester composition having an intrinsic viscosity of at least about 0.67 dl/g. According to either method, the copolyester composition is thereafter spun into copolyester filaments, the copolyester filaments are cut into staple fibers, and the staple fibers are formed into a nonwoven fabric, most advantageously at reduced calendar bonding temperatures.

The foregoing, as well as other objectives and advantages of the invention and the manner in which the same are accomplished, is further specified within the following detailed description and its accompanying drawings.

BRIEF DESCRIPTION OF THE DRAWINGS

FIGS. 3–4 describe strength properties of a nonwoven fabric according to the present invention as compared to strength properties of a conventional nonwoven fabric.

FIGS. 5–6 describe strength properties of a polyester/rayon blended nonwoven fabric according to the present invention.

DETAILED DESCRIPTION

Figure 1:
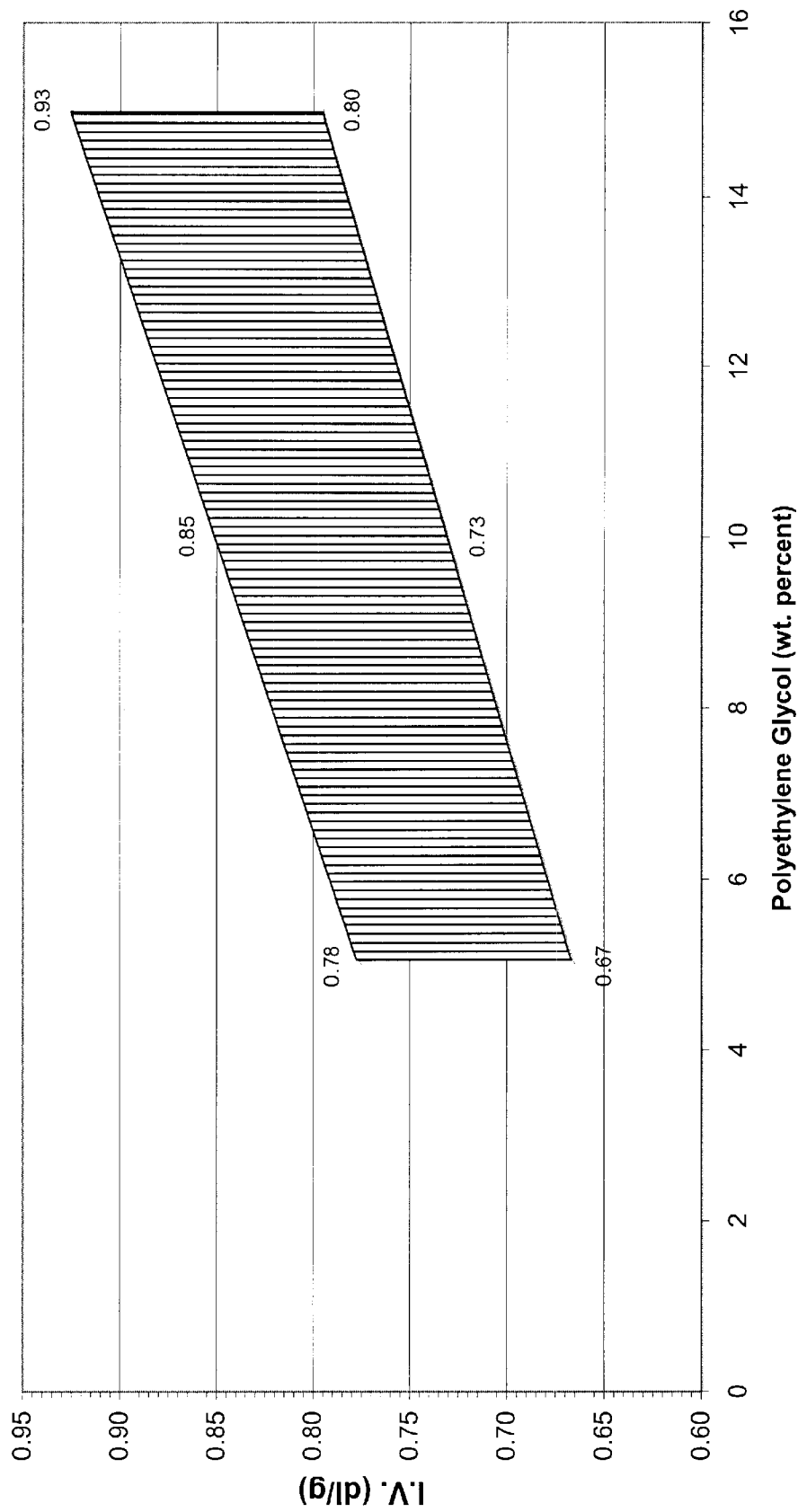
FIG. 1 describes the intrinsic viscosity of PEG-modified copolyester versus the weight fraction of polyethylene glycol when branching agent is employed in an amount of less than about 0.0014 mole-equivalent branches per mole of standardized polymer.

The present invention is a nonwoven fabric having exceptional moisture management characteristics. The nonwoven fabric is formed of polyethylene glycol modified copolyester staple fibers having mean intrinsic viscosity of at least about 0.67 dl/g and including polyethylene terephthalate in an amount sufficient for the copolyester staple fibers to possess dimensional stability properties substantially similar to those of conventional, unmodified polyethylene terephthalate fibers, polyethylene glycol in an amount sufficient for the copolyester staple fibers to possess wicking characteristics that are superior to those of conventional, unmodified polyethylene terephthalate fibers, and chain branching agent, if present, in an amount less than about 0.0014 mole-equivalent branches per mole of standardized polymer. As discussed herein, to describe the molar fraction of branching agent consistently, mole-equivalent branches are referenced to unmodified polyethylene terephthalate.

The nonwoven fabrics of the present invention are especially useful as disposable wipes or disposable undergarments, particularly diapers. In this regard and as herein disclosed, the nonwoven fabrics are formed from polyethylene glycol modified copolyester staple fibers, with or without one or more other kinds of fibers (e.g., rayon or polypropylene). The nonwoven fabrics of the present invention have better wicking characteristics as compared to conventional nonwoven fabrics of a similar construction (i.e., a polyester-containing nonwoven fabric where the polyester fraction is defined by conventional, unmodified polyethylene terephthalate fibers rather than the present polyethylene glycol modified copolyester fibers).

The staple fibers that form the nonwoven fabric of the present invention are preferably prepared according to the methods disclosed by U.S. patent application Ser. No. 09/484,822 and its parent, U.S. patent application Ser. No. 09/444,192. As noted, each of these pending applications is commonly assigned with this application and is incorporated entirely herein by reference.

U.S. patent application Ser. No. 09/444,192 discloses a method of preparing PEG-modified copolyester fibers by copolymerizing polyethylene glycol into polyethylene terephthalate in the melt phase to form a copolyester composition, then polymerizing the copolyester composition in the solid phase until the copolyester is capable of achieving a melt viscosity that facilitates the spinning of filaments, and thereafter spinning filaments from the copolyester.

Alternatively, U.S. patent application Ser. No. 09/484,822 discloses a method of preparing PEG-modified copolyester fibers that can be formed into exceptionally comfortable fabrics. In a broad aspect, the method includes copolymerizing polyethylene glycol and a chain branching agent into polyethylene terephthalate in the melt phase to form a copolyester composition having an intrinsic viscosity of at least about 0.67 dl/g, and preferably a zero-shear melt viscosity of between about 2000 and 3500 poise when heated to 260° C.

In one respect, the method of U.S. patent application Ser. No. 09/484,822 differs from the method of its parent, U.S. patent application Ser. No. 09/444,192, in that the melt polymerization is continued until an intrinsic viscosity of at least 0.67 dl/g, is achieved. In contrast, the parent application employs a solid state polymerization step to achieve high intrinsic viscosities.

The present invention incorporates into polyester fibers, and hence nonwoven fabrics formed from such polyester fibers, the favorable properties of polyethylene glycol, such as its outstanding wicking properties, by employing a higher intrinsic viscosity. This compensates for the tendency of higher fractions of polyethylene glycol to lower the melt viscosity of the copolyester. Consequently, the present method of forming nonwoven fabrics from copolyester staple fibers need not employ significant amounts of branching agent. As will be understood by those of skill in the art, a low melt viscosity hinders the processing of copolyester through conventional spinning equipment.

As used herein, the term "copolyester fiber" broadly refers to uncut filament (e.g., POY, flat-drawn yarn, or textured yarn) and cut fiber (e.g., staple fiber). Although the term "copolyester filament" may include fibers, such as staple, that are subsequently cut from spun filament, it is generally used to refer to an extruded fiber of indefinite length. The meaning of the terms "copolyester fiber" and "copolyester filament" will be easily understood by those of ordinary skill in the art based on the contextual use of these terms. It is preferred that the nonwoven fabrics of the present invention be formed from staple copolyester fibers, and perhaps one or more other kinds of fibers (e.g., cellulosic fibers).

The terms "melt viscosity" and "intrinsic viscosity" are used herein in their conventional sense. Melt viscosity represents the resistance of molten polymer to shear deformation or flow as measured at specified conditions. Melt viscosity is primarily a factor of intrinsic viscosity, shear, and temperature. As used herein, the term "melt viscosity" refers to "zero-shear melt viscosity" unless indicated otherwise.

The zero-shear melt viscosity at a particular temperature can be calculated by employing ASTM Test Method D-3835-93A to determine melt viscosities at several shear rates between about 35 $sec^{-1}$ and 4000 $sec^{-1}$, and thereafter extrapolating these melt viscosities to zero. In calculating zero-shear viscosity, it is recommended that several low shear rates, (e.g., less than 100 $sec^{-1}$), be included to ensure that the extrapolation to zero is accurate.

Intrinsic viscosity is the ratio of the specific viscosity of a polymer solution of known concentration to the concentration of solute, extrapolated to zero concentration. Intrinsic viscosity is directly proportional to average polymer molecular weight. See, e.g., *Dictionary of Fiber and Textile Technology*, Hoechst Celanese Corporation (1990); Tortora & Merkel, *Fairchild's Dictionary of Textiles* ($7^{th}$ Edition 1996). As used herein, average molecular weight refers to number-average molecular weight, rather than weight-average molecular weight.

Both melt viscosity and intrinsic viscosity, which are widely recognized as standard measurements of polymer characteristics, can be measured and determined without undue experimentation by those of ordinary skill in this art. For the intrinsic viscosity values described herein, the intrinsic viscosity is determined by dissolving the copolyester in orthochlorophenol (OCP), measuring the relative viscosity of the solution using a Schott Autoviscometer (AVS Schott and AVS 500 Viscosystem), and then calculating the intrinsic viscosity based on the relative viscosity. See, e.g., *Dictionary of Fiber and Textile Technology* ("intrinsic viscosity").

In particular, a 0.6-gram sample (+/−0.005 g) of dried polymer sample is dissolved in about 50 ml (61.0–63.5 grams) of orthochlorophenol at a temperature of about 105° C. Fiber and yarn samples are typically cut into small pieces, whereas chip samples are ground. After cooling to room temperature, the solution is placed in the viscometer and the relative viscosity is measured. As noted, intrinsic viscosity is calculated from relative viscosity.

In one aspect, the invention is a method related to U.S. patent application Ser. No. 09/444,192. This method of making a nonwoven fabric having exceptional wicking characteristics includes copolymerizing polyethylene glycol into polyethylene terephthalate in the melt phase to form a copolyester composition, usually to an intrinsic viscosity of less than about 0.65 dl/g. The melt phase copolymerization of polyethylene glycol into polyethylene terephthalate preferably includes copolymerizing polyethylene glycol and a chain branching agent into polyethylene terephthalate in the melt phase to form a copolyester composition in which the chain branching agent is present in the copolyester composition in an amount of less than about 0.0014 mole-equivalent branches per mole of standardized polymer. The copolyester composition is then further polymerized in the solid phase until the copolyester composition is capable of achieving a melt viscosity that facilitates the spinning of fibers (i.e., the solid copolyester would have that melt viscosity if it were melted without further solid state polymerization). In this regard, the copolyester composition is polymerized in the solid phase until the copolyester is capable of achieving a zero-shear melt viscosity of at least about 2000 poise at 260° C. Thereafter, the copolyester composition is spun into copolyester filaments, the copolyester filaments are formed (e.g., cut) into staple fibers, and the staple fibers are formed into a nonwoven fabric.

In another aspect, the invention is a method related to U.S. patent application Ser. No. 09/484,822. This method of making a nonwoven fabric having exceptional wicking characteristics includes copolymerizing polyethylene glycol and chain branching agent into polyethylene terephthalate in the melt phase to form a copolyester composition having an intrinsic viscosity of at least about 0.67 dl/g. More specifically, the polyethylene terephthalate is present in the copolyester composition in an amount sufficient for fibers made from the copolyester composition to possess dimensional stability properties substantially similar to those of conventional, unmodified polyethylene terephthalate fibers, the polyethylene glycol has an average molecular weight of less than about 5000 g/mol and is present in an amount sufficient for fibers made from the copolyester composition to possess wicking characteristics that are superior to those of conventional, unmodified polyethylene terephthalate fibers, and the chain branching agent is present in the copolyester composition in an amount less than about 0.0014 mole-equivalent branches per mole of standardized polymer, preferably between about 0.03 and 0.14 percent mole-equivalent branches per mole of standardized polymer. Thereafter, the copolyester composition is spun into copolyester filaments, the copolyester filaments are formed (e.g., cut) into staple fibers, and the staple fibers are formed into a nonwoven fabric.

As will be understood by those having ordinary skill in the art, copolymerizing polyethylene glycol and branching agent into polyethylene terephthalate is conventionally achieved by reacting ethylene glycol and either terephthalic acid or dimethyl terephthalate in the presence of polyethylene glycol and branching agent. Consequently, it is preferred that the copolymerization of polyethylene glycol and chain branching agent into polyethylene terephthalate yield a copolyester composition comprising polymer chains formed from structural units consisting essentially of diol monomers, aromatic non-substituted diacid monomers, and branching agent monomers, or, when branching agent is not present, polymer chains formed from structural units consisting essentially of diol monomers and aromatic non-substituted diacid monomers. As herein described, such copolyester compositions are preferably formed into copolyester fibers.

The term "diol monomer" as herein used refers to diols, such as ethylene glycol, propylene glycol, and butane diol, as well as ethers that possess terminal alcohols, such as diethylene glycol (DEG). In this regard, polyethylene glycol (PEG) is formed from such ethylene glycol monomers and is therefore embraced by the term "diol monomer." The term "aromatic non-substituted diacid monomers" as herein used refers to aromatic carboxylic diacids and diesters, especially terephthalic acid (TA) and its dialkyl ester, dimethyl terephthalate (DMT), whose functional groups are limited to those that facilitate polymer chain growth and that can be used to prepare modified polyethylene terephthalate. Accordingly, "aromatic non-substituted diacid monomers" include single-ringed compounds, such as isophthalic acid and its dialkyl ester (i.e., dimethyl isophthalate), and polycyclic compounds, such as 2,6-naphthalene dicarboxylic acid or its dialkyl ester (i.e., dimethyl 2,6-naphthalene dicarboxylate). Finally, the term "branching agent" refers to a multifunctional monomer that promotes the formation of side branches of linked monomer molecules along the main polymer chain. See Odian, *Principles of Polymerization*, pp. 18–20 (Second Edition 1981).

Moreover, it will be understood by those of ordinary skill in the art that the terminal ends of the copolyester chains may be structural units characterized by a lone, chain-propagating reactive site. Such chain terminating groups are within the scope of the phrase "consisting essentially of diol monomers, aromatic non-substituted diacid monomers, and branching agent monomers," or, when branching agent is excluded, the phrase "consisting essentially of diol monomers and aromatic non-substituted diacid monomers."

In accordance with the invention, copolyester characteristics can be tailored for specific applications by altering the polyethylene glycol content. This permits choice in designing fabrics made with copolyester or copolyester blends according to the present invention. In this sense, the invention establishes a technology family. For example, the weight fraction and the molecular weight of the polyethylene glycol can be adjusted to produce specific effects, such as wicking, drying, dye rates, stretch, and softness. Similarly, such modifications can improve the dye strike rate and reduce the dye usage. In particular, higher polyethylene glycol fractions, (e.g., greater than about 4 weight percent), result in softer fabrics that wick faster, dry quicker, and dye darker as compared to conventional polyesters. The present copolyester shows as much as 30 percent more dye uptake of non-exhaustive polyester dye formulations as compared to conventional polyesters. For nonwoven fabrics, especially blended nonwoven fabrics, the polyethylene glycol fraction in the copolyester fibers is typically selected to enhance wickability.

In practicing the present invention, it is preferred that the polyethylene glycol formulations include sufficient concentrations of antioxidants to prevent formaldehyde generation during spinning operations. For example, the polyethylene glycol used in the development of the present invention includes about 1.36 weight percent of Irganox 245, an antioxidant that is available from Ciba-Geigy. The inclusion of this or similar antioxidants will not adversely affect the products or methods herein described.

Those familiar with textile terminology will understand that "spinning" refers to two different processes. In one sense, the term "spinning" refers to the production of synthetic polymer filaments from a polymer melt. In its older, conventional use, the term "spinning" refers to the process of twisting a plurality of individual fibers into yarns. The use of both of these terms is widespread and well understood in this art such that the particular use herein should be easily recognized by those of ordinary skill in the art.

In preferred embodiments, the polyethylene glycol is present in the copolyester composition in an amount between about 4 weight percent and 20 weight percent. When amounts of polyethylene glycol greater than about 20 weight percent are present, the resulting copolyester does not polymerize efficiently. Moreover, at such elevated polyethylene glycol fractions, the copolyester composition is difficult to store and transport for it tends to crystallize, which causes undesirable sticking and clumping. For nonwoven fabrics, polyethylene glycol amounts between about 10 weight percent and 20 weight percent are more preferred, and amounts between about 10 weight percent and 12 weight percent are most preferred. To maximize wickability, polyethylene glycol may be used in amounts between about 15 weight percent and 20 weight percent. In another embodiment, polyethylene glycol is present at about 5 weight percent (e.g., amounts between 4 weight percent and 6 weight percent).

Furthermore, while polyethylene glycol with an average molecular weight of less than about 5000 g/mol, (e.g., between about 200 and 5000 g/mol), may be effectively employed, the preferred average molecular weight for polyethylene glycol is between about 300 and 1000 g/mol, most preferably about 400 g/mol.

For consistency in discussing composition and fiber properties, the data herein disclosed refer to copolyester of the present invention that is modified between about 10 and 12 weight percent polyethylene glycol having a molecular weight of about 400 g/mol, unless indicated otherwise.

As known to those familiar with the manufacture of polyester, the equipment used to spin polyester into filaments is designed, built, and adjusted to process polymers whose zero-shear melt viscosity falls within a certain range, typically between about 1500 and 4000 poise. Thus, such equipment runs most satisfactorily when the melt viscosity of the copolyester, which is directly proportional to the intrinsic viscosity as discussed herein, is within this viscosity range. If polyethylene glycol is included in relatively significant amounts (i.e., more than about 4 weight percent), a number of spinning failures are likely to occur when the intrinsic viscosity is not increased. In other words, high polyethylene glycol fractions can suppress melt viscosity, which in turn can hinder spinning productivity.

Thus, the polymerization of polyethylene glycol and branching agent into polyethylene terephthalate continues until the PEG-modified polyester is capable of achieving a melt viscosity sufficient for practical processing, and sufficient spinning tensions for a stable and high-throughput commercial process. This is so despite the presence of only insignificant amounts of branching agent (i.e., usually between about 0.03 and 0.14 percent mole-equivalent branches per mole of standardized polymer).

According to the present method, copolyester filaments are preferably spun at a temperature between about 260° C. and 300° C. This temperature range comports with that employed in conventional spinning equipment using Dowtherm A vapor heat transfer media, which is available from Dow Chemical Co.

In one preferred embodiment, the method includes copolymerizing between about 10 and 12 weight percent polyethylene glycol and a chain branching agent, usually in an amount between about 0.0003 and 0.0014 mole-equivalent branches per mole of standardized polymer into polyethylene terephthalate, to form a copolyester composition that achieves a zero-shear melt viscosity of between about 2000 and 3500 poise when heated to 260° C.

In another embodiment, the copolyester composition is spun into filaments having a mean tenacity of less than 3 grams per denier. A tenacity of less than 3 grams per denier accentuates the superior tactility (i.e., soft hand) of nonwoven fabrics formed from such copolyester staple fiber, and reduces the tendency of staple fiber to pill.

As will be understood by those having ordinary skill in this art, the copolyester need not be spun immediately after undergoing melt polymerization. Rather, the copolyester may be formed into chips after the step of copolymerizing polyethylene glycol and a chain branching agent into polyethylene terephthalate in the melt phase and before the step of spinning the copolyester composition into a filament. Where solid state polymerization is employed, the copolyester is formed into chips after the step of copolymerizing polyethylene glycol into polyethylene terephthalate in the melt phase and before the step of polymerizing the copolyester composition in the solid phase.

As discussed previously, in one aspect the invention includes forming polyethylene glycol modified copolyester filaments by copolymerizing polyethylene glycol into polyethylene terephthalate in the melt phase to form a copolyester composition, then polymerizing the copolyester composition in the solid phase until the copolyester composition is capable of achieving a melt viscosity that facilitates the spinning of filaments, and thereafter spinning filaments from the copolyester. In another aspect, the invention includes copolymerizing polyethylene glycol and a chain branching agent into polyethylene terephthalate in the melt phase to form a copolyester composition having an intrinsic viscosity of at least about 0.67 dl/g, and thereafter spinning the copolyester composition into a filament. For either technique, FIG. 1 defines a desirable range of intrinsic viscosities of the copolyester after polymerization as a function of the weight fraction of polyethylene glycol when chain branching agent is present in the copolyester composition in an amount less than 0.0014 mole-equivalent branches per mole of standardized polymer (e.g., less than about 500 ppm of pentaerythritol).

In particular, when the weight fraction of polyethylene glycol in the copolyester composition is about 5 percent, the copolyester composition is preferably polymerized to an intrinsic viscosity of between about 0.67 and 0.78 dl/g. Similarly, when the weight fraction of polyethylene glycol in the copolyester composition is between about 10 and 12 percent, the copolyester composition is preferably polymerized to an intrinsic viscosity of between about 0.73 and 0.88 dl/g. Finally, when the weight fraction of polyethylene glycol in the copolyester composition is about 15 percent, the copolyester composition is preferably polymerized to an intrinsic viscosity of between about 0.80 and 0.93 dl/g.

The commonly-assigned patent application Ser. No. 09/141,665 discloses that chain branching agents can raise the melt viscosity of PEG-modified copolymer melt to within the range of normal, unmodified polyethylene terephthalate. In contrast, patent application Ser. No. 09/444,192 and continuing patent application Ser. No. 09/484,822 introduce alternative methods of producing fibers from PEG-modified copolyester without resorting to significant fractions of branching agent. In accordance with these disclosures, chain branching agent is present in the copolyester composition of the present invention in an amount less than about 0.0014 mole-equivalent branches per mole of standardized polymer, and preferably between about 0.0003 and 0.0014 mole-equivalent branches per mole of standardized polymer.

As used herein, the term "mole-equivalent branches" refers to the reactive sites available for chain branching on a molar basis (i.e., the number of reactive sites in excess of the two required to form a linear molecule). For example, pentaerythritol is a tetrafunctional branching agent, so it possesses two available chain branching reactive sites.

In addition, as used herein, the term "standardized polymer" refers to the repeat unit of unmodified polyethylene terephthalate, which has a molecular weight of 192 g/mol. In this regard, it will be understood by those of skill in the art that, for a given total weight of polyethylene terephthalate, polyethylene glycol, and branching agent, increasing the relative weight fraction of polyethylene glycol, which preferably has a molecular weight of less than 5000 g/mol, will decrease total moles. (This is so because the molecular weight of polyethylene terephthalate is less than the molecular weight of the polyethylene glycol.) Consequently, to maintain uniformity across various concentrations and molecular weights of polyethylene glycol, the chain branching agent concentration of less than about 0.0014 mole-equivalent branches per mole of standardized polymer is based on the repeat unit of unmodified polyethylene terephthalate.

In other words, the weight fraction of branching agent should be calculated as if the polymer is made of only unmodified polyethylene terephthalate. Consequently, the weight fraction of polyethylene glycol (e.g., preferably between about 4 weight percent and 20 weight percent) and the molecular weight of the polyethylene glycol (e.g., preferably less than about 5000 g/mol) can be disregarded in calculating mole-equivalent branches per mole of standardized polymer.

For example, an amount of pentaerythritol between about 0.0003 and 0.0014 mole-equivalent branches per mole of the copolyester composition is equivalent to a weight fraction of between about 100 and 500 ppm when based on the standardized polymer of unmodified polyethylene terephthalate, whose repeat unit has a molecular weight of about 192 g/mol.

To further illustrate this relationship, assume 1000 grams of starting materials—500 ppm pentaerythritol, which has a molecular weight of 136.15 g/mol, and the remainder polyethylene terephthalate. This is equivalent to 0.5 gram pentaerythritol, or 0.00367 moles of pentaerythritol, and 999.5 grams polyethylene terephthalate, or 5.21 moles polyethylene terephthalate repeat units. The mole fraction of pentaerythritol relative to the polyethylene terephthalate is, therefore, 0.0705 mole percent (i.e., 0.00367 moles of pentaerythritol÷5.21 moles polyethylene terephthalate). As noted, pentaerythritol has two available chain branching reactive sites. Thus, the mole-equivalent branches per mole of unmodified polyethylene terephthalate is 0.14 percent (i.e., 0.0014 mole-equivalent branches per mole of standardized polymer.)

The weight fraction corresponding to mole-equivalent branches per mole of standardized polymer can be estimated for any branching agent using the following equation:

$$\text{branching agent (ppm)} = (MEB \div CBRS) \cdot (BAMW \div SPMW) \cdot 10^6,$$

wherein

MEB=mole-equivalent branches per mole of standardized polymer

CBRS=number of available chain branching reactive sites

BAMW=molecular weight of the branching agent (g/mol)

SPMW=192 g/mol-molecular weight of the standardized polymer (i.e., unmodified polyethylene terephthalate)

It will be appreciated by those of skill in the chemical arts that if the mole-equivalent branches were not referenced to a mole of standardized polymer, a branching agent concentration of 0.0014 mole-equivalent branches per mole of polymer (i.e., the copolyester composition) would translate to a slightly lower weight fraction, (i.e., ppm), when a greater polyethylene glycol weight fraction is used, or when polyethylene glycol having a higher average molecular weight is employed.

For example, if mole-equivalent branches per mole of polymer were not related to a common standard, but rather to the actual components of the copolyester composition, an amount of pentaerythritol less than about 0.0014 mole-equivalent branches per mole of the copolyester composition would be equivalent to a weight fraction of less than about 450 ppm when based on polyethylene terephthalate that is modified by 20 weight percent polyethylene glycol having an average molecular weight of about 400 g/mol. Likewise, an amount of pentaerythritol less than about 0.0014 mole-equivalent branches per mole of the copolyester composition would be equivalent to a weight fraction of less than about 400 ppm when based on polyethylene terephthalate that is modified by 20 weight percent polyethylene glycol having an average molecular weight of about 5000 g/mol. By employing unmodified polyethylene terephthalate as the standardized polymer, however, an amount of pentaerythritol less than about 0.0014 mole-equivalent branches per mole of standardized polymer is equivalent to a weight fraction of less than about 500 ppm regardless of the weight fraction or molecular weight of the polyethylene glycol.

To the extent a chain branching agent is employed, the chain branching agent is preferably a trifunctional or tetrafunctional alcohol or acid that will copolymerize with polyethylene terephthalate. As will be understood by those skilled in the art, a trifunctional branching agent has one reactive site available for branching and a tetrafunctional branching agent has two reactive sites available for branching. Acceptable chain branching agents include, but are not limited to, trimesic acid ($C_6H_3(COOH)_3$), pyromellitic acid ($C_6H_2(COOH)_4$), pyromellitic dianhydride, trimellitic acid, trimellitic anhydride, trimethylol propane ($C_2H_5C(CH_2OH)_3$), ditrimethylol propane ($C_2H_5C(CH_2OH)_2C_2H_4OC(CH_2OH)_2C_2H_5$), dipentaerythritol ($CH_2OHC(CH_2OH)_2C_2H_4OC(CH_2OH)_2CH_2OH$), and preferably pentaerythritol ($C(CH_2OH)_4$). If the total number of reactive sites exceeds four per branching agent molecule, steric hindrance can sometimes prevent full polymerization at the available reactive sites such that more branching agent may be required to achieve the desired mole-equivalent branches. See, e.g., U.S. Pat. Nos. 4,092,299 and 4,113,704 by MacLean and Estes.

As noted previously, the nonwoven fabrics of the present invention have better wicking characteristics as compared with conventional nonwoven fabrics of a similar construction. Accordingly, the nonwoven fabrics of the present invention are especially useful as personal hygiene products, such as disposable diapers or wipes.

As will be understood by those familiar with disposable personal hygiene products, the surge layer in diapers must efficiently wick moisture from skin to an absorbent core. In this regard, nonwoven fabrics formed of 100-percent copolyester staple fibers of the present invention are superior to nonwoven fabrics formed of 100-percent conventional polyester staple fibers.

As will also be understood by those familiar with disposable personal hygiene products, disposal wipes must be very absorbent. In this regard, rayon, which is highly absorbent, is preferred. Nonetheless, polyester is often added to rayon blends to increase strength, improve processing performance, and reduce product costs. Unfortunately, including polyester fibers in disposable wipes can inhibit absorbency. As herein discussed, however, the superior wicking of the copolyester fibers according to the present invention will improve the overall absorption rate in 50/50 polyester/rayon blended nonwoven fabrics. This is significant in disposable wipes, where absorbency is so desirable. Without being bound to a particular theory, it is believed that the PEG-modified copolyester fibers facilitate the movement of moisture to the rayon fibers.

The nonwoven fabric of the present invention is further characterized by an improved ability to retain its inherent wicking properties even after several liquid insults, as compared to a nonwoven fabric formed of an equivalent fraction of conventional, unmodified polyethylene terephthalate fibers.

Figure 2:
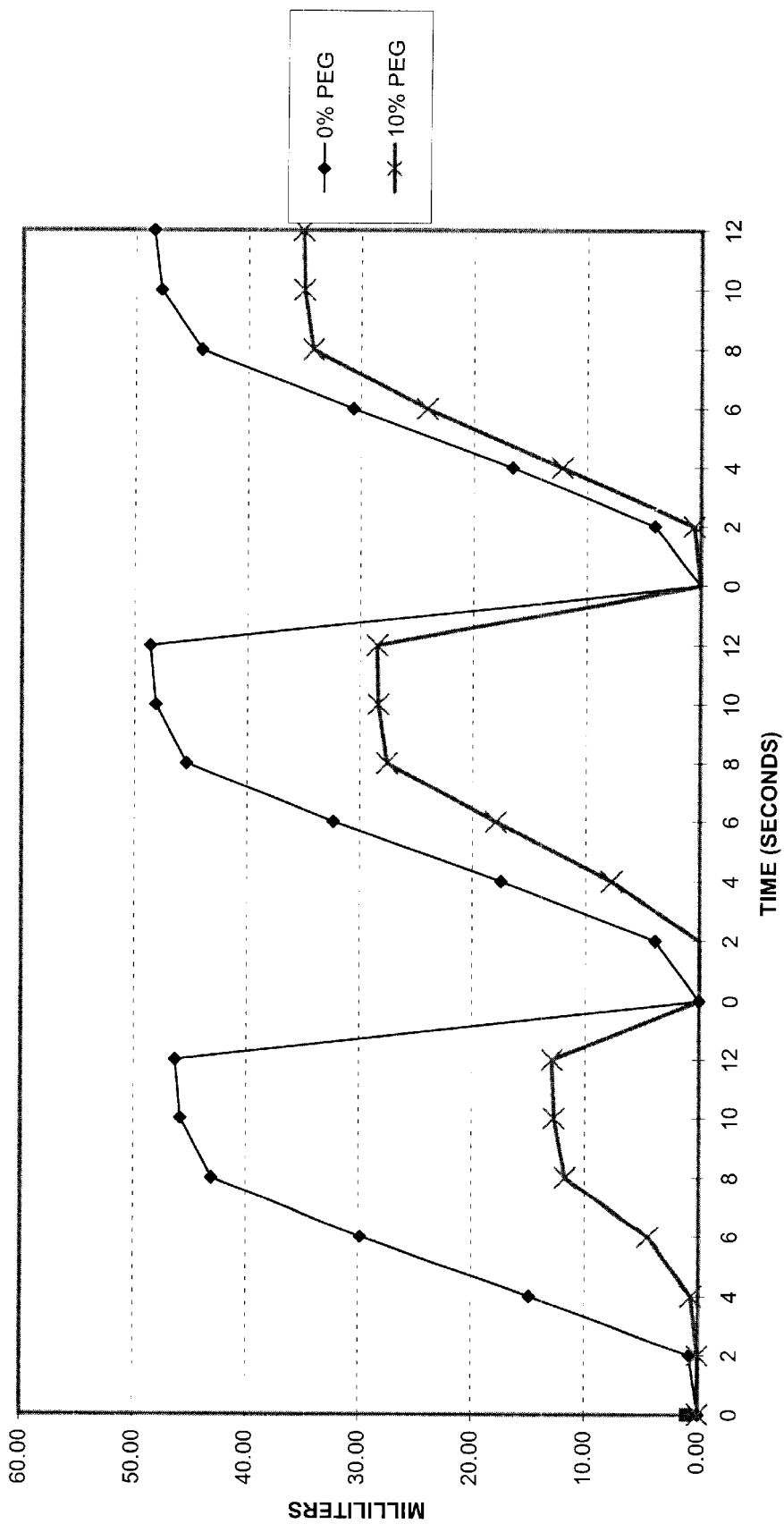
FIG. 2 describes Multiple Insult Liquid Acquisition test results for a nonwoven fabric according to the present invention as compared to strength properties of a conventional nonwoven fabric.

To evaluate performance of the nonwoven fabric according to the present invention, 100 percent polyester nonwoven fabrics were subjected to the Multiple Insult Liquid Acquisition Test at Marketing/Technology Service, Inc., of Kalamazoo, Mich. FIG. 2 compares calendar bonded nonwoven samples according to the present invention (50 grams per square meter and produced from carded webs) with conventional calendar bonded nonwoven samples (50 grams per square meter and produced from carded webs). More specifically, the modified nonwoven sample according to the present invention was formed from copolyester staple fibers having about ten weight percent polyethylene glycol, whereas the conventional nonwoven sample fabric was formed from polyester staple fibers having no polyethylene glycol.

The Multiple Liquid Insult Acquisition Test includes sequentially applying 50 ml dosages of a 0.9 percent saline solution to a horizontal sample, and observing each dosage for 12 seconds. Each nonwoven sample is placed over an industry-standard, super-absorbent core having a basis weight of about 600 grams per square meter. The super-absorbent core essentially provides infinite absorption within the constraints of the Multiple Liquid Insult Acquisition Test.

It is desirable for the surge layer fabric to immediately pass the liquid through to the super-absorbent core with minimal liquid overflow. FIG. 2 depicts the amount of liquid overflowing versus time, indicating the amount of liquid that did not successfully make it through to the core. As will be understood by those familiar with diaper technology, low overflow—with delayed onset of overflow—is desirable.

In this regard, the modified product shows appreciably less overflow of liquid when insulted by saline solutions. In FIG. 2, the modified product shows considerably less liquid overflow—and hence appreciably better performance—than does the nonwoven formed from conventional polyester staple fibers.

Moreover, and as will be understood by those of ordinary skill in the art, a finish may be applied to the nonwoven fabric to complement its inherent wickability. This is a conventional technique to enhance fabric performance, but generally results in nonpermanent enhancement of wicking.

While the nonwoven fabrics may be formed from any conventional technique, calendar bonding, hydroentangling, needlepunching, through-air-bonding, stitch-bonding, melt spun-bonding, and melt blowing are especially preferred. In this regard, where the nonwoven according to the present invention is spun-bonded or melt-blown, it is sometimes desirable to enhance the aesthetics of the nonwoven via hydroentangling. Where calendar bonding is employed, the formation of copolyester fibers into a nonwoven fabric includes calendar bonding the copolyester fibers at a temperature of less than about 210° C. Although this is at least about 30° C. below conventional calendar bonding temperatures, fabric strength is maintained.

Strength properties of the nonwoven fabric according to the present invention were also evaluated. FIGS. 3 and 4 compare a modified nonwoven sample, which was formed from copolyester staple fibers having about ten weight percent polyethylene glycol, with a conventional nonwoven sample fabric that was formed from polyester staple fibers having no polyethylene glycol. One-inch strips of these nonwoven fabrics (50 grams per square meter and produced from carded webs) were tested according to ASTM test procedure D5035-95, "Standard Test Method for Breaking Force and Elongation of Textile Fabrics (Strip Method)." FIGS. 3 and 4 indicate that nonwovens possessing identical strength to conventional polyester nonwovens can be obtained at a reduced bonding temperature (i.e., 20–40° C. less).

Operating at lower bonding temperatures not only offers significant energy savings, but also produces fewer emissions as lower temperatures volatilize less fiber finish. Moreover, more kinds of equipment can be used. For example, polyester fibers typically cannot be processed on equipment configured to bond olefin fibers, which bond at much lower temperatures. Data indicate that equipment that is configured for olefins can be employed to bond polyester fibers without extensive modification.

Strength properties of the 50/50 polyester/rayon blended nonwoven fabrics according to the present invention were also evaluated. FIGS. 5 and 6 compare a blended modified nonwoven sample, which was formed from rayon fibers and copolyester staple fibers having about ten weight percent polyethylene glycol, with a conventional blended nonwoven sample fabric that was formed from rayon fibers and polyester staple fibers having no polyethylene glycol. One inch strips of these nonwoven fabrics (50 grams per square meter and produced from carded webs) were tested according to ASTM test procedure D5035-95, "Standard Test Method for Breaking Force and Elongation of Textile Fabrics (Strip Method)."

FIGS. 5 and 6 indicate that blended nonwovens according to the present invention are significantly stronger than conventional blended nonwovens, which are not commercially viable in calendar-bonded rayon blends without a binder fiber because of low strength. As will be known by those familiar with nonwovens, binder fiber is generally expensive and, aside from fabric strength, enhances no meaningful fabric property. In contrast, the greater strength and elongation of the blended nonwoven that was formed from rayon fibers and 10-percent PEG-modified copolyester staple fibers indicates its commercial viability without employing a binder fiber.

Accordingly, in preferred embodiments, the nonwoven fabric is a blended nonwoven fabric including at least one additional kind of fiber. For example, the copolyester staple fibers may be blended with cotton fibers, rayon fibers, polypropylene fibers, acetate fibers, nylon fibers, spandex fibers, biconstituent fibers, or even conventional polyester fibers.

In one preferred embodiment, the nonwoven fabric includes at least cellulosic fibers (e.g., rayon or cotton) in addition to the copolyester staple fibers. The copolyester/cellulosic blends preferably include between about 5 percent and 95 weight percent cellulosic fibers with the remainder comprising the copolyester fibers. Most preferably, the blend includes between about 30 weight percent and 70 weight percent cellulosic fibers with the remainder comprising the copolyester fibers. In particular, nonwoven fabrics having exceptional moisture management properties may be formed from cellulosic fibers, which are present in the nonwoven fabric in an amount sufficient to provide excellent absorbency, and copolyester fibers, which are present in the nonwoven fabric in an amount sufficient to provide excellent wickability. A 50/50 blend of rayon and copolyester has been found to provide excellent properties for wipes and other absorbent articles.

To further evaluate performance of the blended nonwoven fabrics according to the present invention, 50/50 rayon blended nonwoven fabrics were tested at Marketing/Technology Service, Inc., of Kalamazoo, Mich. In particular, these nonwoven fabrics were subjected to "Demand Wettability Measurement of Absorbency Characteristics," as published by Dr. Bernard M. Lichstein of Johnson & Johnson.

In accordance with this test procedure, fabric samples are held horizontally with a small tube set to supply water at a low, constant hydrostatic head. A valve in the tube is opened, and the fabric is allowed to absorb as much liquid as it can until the change in liquid absorbency becomes acceptably small, indicating that the fabric is saturated. The absorbency factor is then determined by dividing the volume of liquid absorbed by the fabric weight. (This accounts for fabric weight differences between samples.) This is divided by the square root of the duration of absorbency to saturation to calculate the final absorbency rate.

Figure 7:
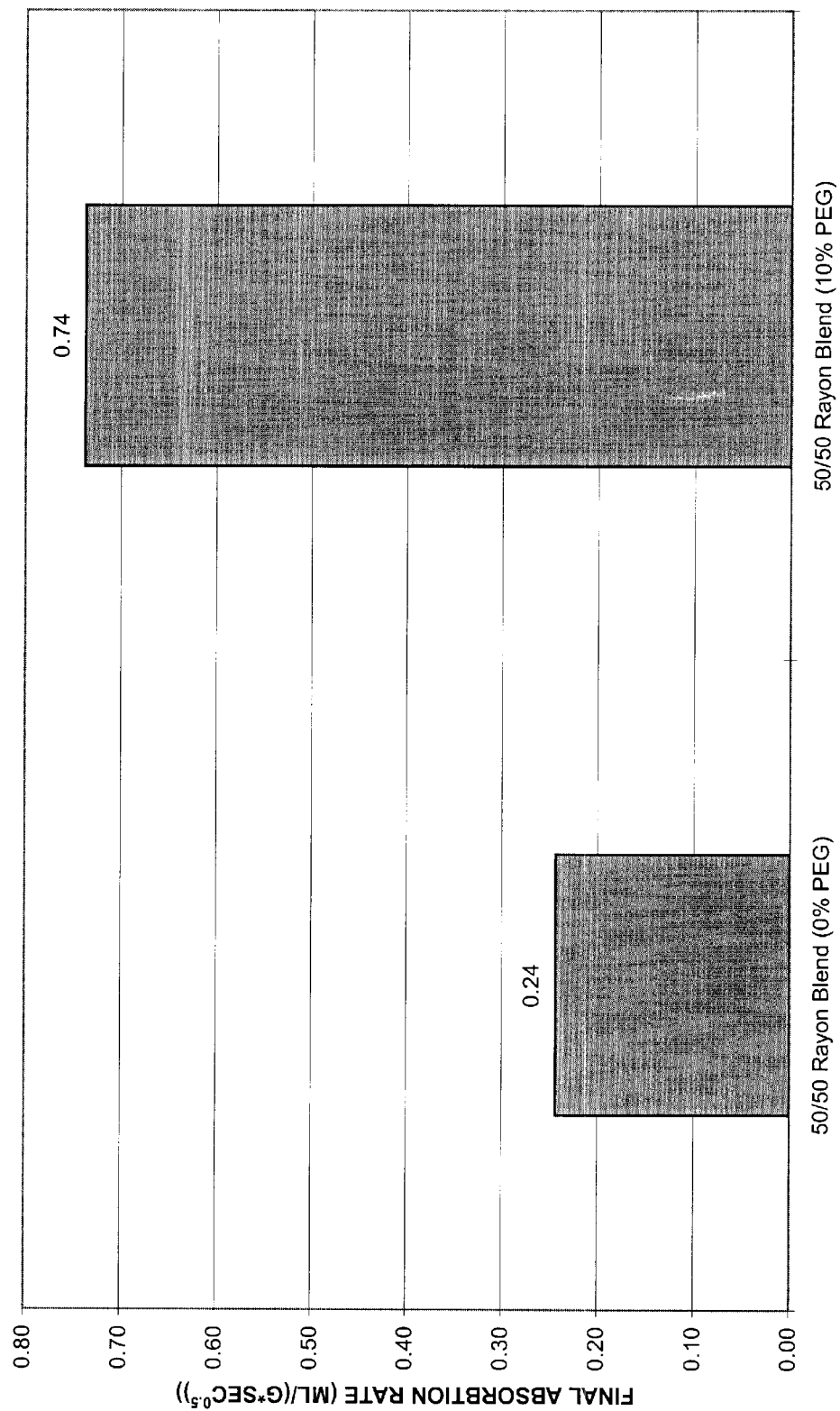
FIG. 7 describes Demand Wettability test results for a nonwoven fabric according to the present invention as compared to strength properties of a conventional nonwoven fabric.

FIG. 7 compares the absorbency rate of a blended modified nonwoven sample, which was formed from rayon fibers and copolyester staple fibers having about ten weight percent polyethylene glycol, with the absorbency rate of a conventional blended nonwoven sample fabric that was formed from rayon fibers and polyester staple fibers having no polyethylene glycol.

As depicted in the FIG. 7, the nonwoven according to the present invention offers significantly increased absorbency as compared to the conventional nonwoven. The enhanced wicking characteristics of the present copolyester fibers facilitate the movement of moisture to the highly absorbent rayon. This enables the fabric surface to absorb more liquid.

The combination of significantly enhancing absorbency in rayon blends while achieving sufficient fabric strength during calendar bonding, without resorting to the inclusion of binder fibers, is particularly interesting. For example, a blend of the polyethylene glycol modified polyester staple fibers and highly absorbent fibers may be thermally bonded to form a desirable nonwoven product.

A nonwoven fabric including PEG-modified copolyester fibers and other fibers having low-melt temperatures can be formed by calendar bonding copolyester fibers and low-melt fibers at temperatures well below conventional calendar bonding temperatures. Such low-melt fibers preferably include polypropylene fibers, low-melt polyester fibers, or biconstituent fibers of the same, all of which can be calendar bonded at a temperature of less than about 170° C. Accordingly, in another embodiment, the copolyester nonwoven fabric further includes biconstituent fibers, such as a polyester core surrounded by a sheath of polypropylene or low-melt polyester.

The inclusion of PEG-modified copolyester fibers in nonwoven fabrics of the present invention improves dyeing characteristics as compared to a nonwoven fabric formed of an equivalent fraction of conventional, unmodified polyethylene terephthalate fibers. In this regard, it will be understood by those of skill in the art that the polyethylene glycol reduces melt temperature ($T_m$) and glass transition temperature ($T_g$). For example, at a 10 weight percent substitution of polyethylene glycol having a molecular weight of about 400 g/mol, $T_m$ is approximately 238° C. and $T_g$ is approximately 48° C. Consequently, the temperature at which dyes will penetrate the modified polyester structure is lowered.

Accordingly, the present invention facilitates dyeing the copolyester fibers at a temperature of less than about 240° F.

Above 240° F., fastness may somewhat decrease using certain dyes at high concentrations. In one preferred embodiment, the method includes dyeing the copolyester fibers at a temperature of less than about 230° F. In yet another preferred embodiment, the method includes dyeing the copolyester fibers at a temperature of less than about 220° F. In fact, the copolyester fibers can be dyed at or below the temperature defined by the boiling point of water at atmospheric pressure (i.e., 212° F. or 100° C.). It will be understood by those of ordinary skill in the art that dyeing the copolyester fibers includes dyeing nonwoven fabrics formed from such PEG-modified copolyester fibers, including blends with one or more other kinds of fiber.

More specifically, the copolyester fibers can achieve excellent color depth even when dyed at 200° F. In this regard, when high-energy disperse dyes (e.g., Color Index Disperse Blue 79) are employed, the copolyester fibers are most preferably dyed between about 200° F. and 212° F. Similarly, when low-energy disperse dyes (e.g., Color Index Disperse Blue 56) are employed, the copolyester fibers are preferably dyed between about 180° F. and 200° F., and most preferably dyed between about 180° F. and 190° F. As will be understood by those of ordinary skill in the dyeing arts, with respect to the present copolyester fibers, high-energy dyes typically have better wash fastness and poorer light fastness as compared to low-energy dyes.

A particular advantage of the present invention is that the disclosed copolyester fibers may be dyed at atmospheric pressure without a carrier (i.e., a dye bath additive that promotes the dyeing of hydrophobic fibers), although leveling and dispersing agents are recommended. Moreover, unlike conventional polyester fibers, which typically require an acidic dye bath adjustment to a pH of about 4–5, the present copolyester fibers do not require any pH modification. In this regard, the copolyester can be effectively disperse dyed in an alkaline dye bath having a pH as high as 10, limited only by the stability of the disperse dyes at such alkaline conditions and 210° F. rather than the properties of the present copolyester. Furthermore, the copolyester fibers of the present invention have comparable hand to polyester microfibers (i.e., fibers <1 dpf), yet demonstrate superior dyeing properties.

The nonwoven fabrics of the present invention can include PEG-modified copolyester fibers and cellulosic fibers (e.g., cotton fibers, rayon fibers, or acetate fibers) that can be dyed in one step. This is expected to reduce dyeing and energy expenditures by 30 percent or more. For example, cotton is typically dyed using cotton dyes (e.g., reactive dyes) in alkaline dye baths and polyester is typically dyed at high temperatures (e.g. 265° F.) in acidic dye baths. Accordingly, dyeing blended cotton and polyester fabrics requires a two-step dyeing process. Such blends are usually dyed in an alkaline pH using suitable cotton dyes to selectively dye the cotton fibers and are thereafter dyed in an acidic pH using disperse dyes to selectively dye the polyester fibers. As described previously, however, the present copolyester fibers do not require any pH adjustment and can be dyed effectively in an alkaline dye bath having a pH as high as 10. Consequently, blended fabrics that are made from PEG-modified copolyester fibers and cotton fibers or other cellulosic fibers can be dyed simultaneously in an alkaline dye bath that includes both reactive and disperse dyes. Preferably, dyeing such cellulosic/copolyester blends is carried out in a dye bath having a pH of about 10 or less and a temperature at or below the boiling point of water at atmospheric pressure (i.e., 212° F. or 100° C.).

The copolyester fibers formed according to the present invention also possess a high exhaustion rate, which translates to reduced dye costs and fewer environmental issues. In fact, dye uptake is maximized near the normal boiling point of water (i.e., 212° F.). In preferred embodiments, the dyeing of the copolyester fibers employs a relatively high ramp rate of about 5° F. per minute below 100° F., as the fibers absorb little dye at such temperatures. Above 100° F., however, the fibers do absorb dye and so the ramp rate should be reduced to about 2° F. per minute to achieve level dyeing. Optionally, a holding period between about 5 and 10 minutes may be employed between about 120° F. and 190° F. to promote level dyeing.

Figure 8:
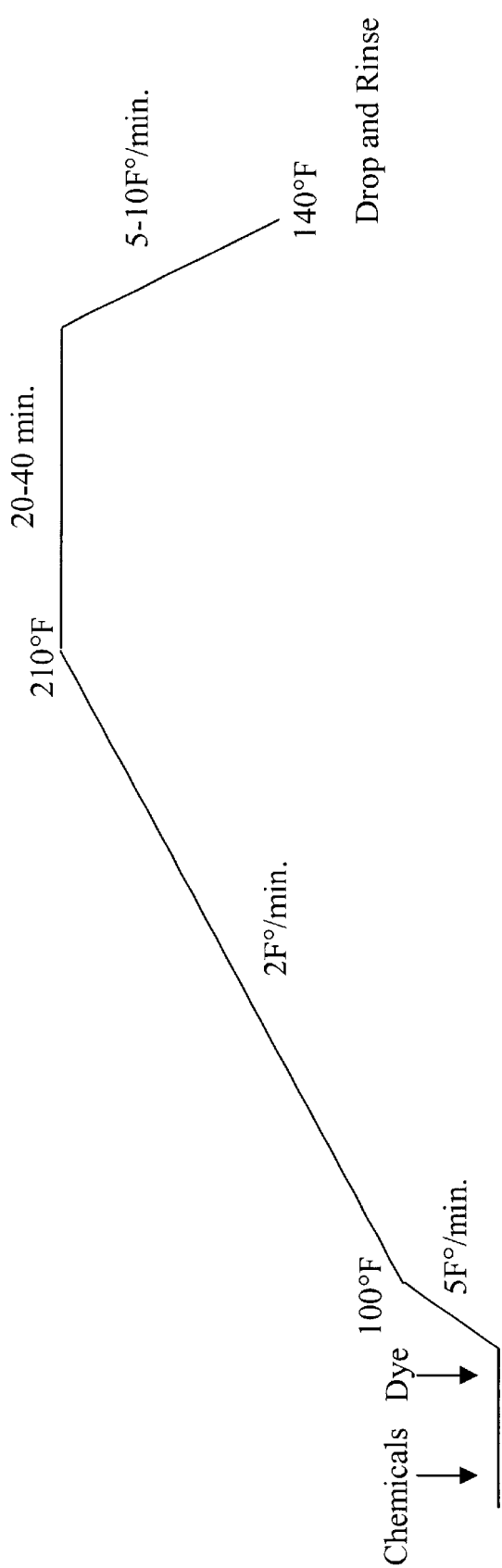
FIG. 8 describes an effective model for batch dyeing the copolyester fibers produced according to the present invention.

An effective ramp technique for batch dyeing, especially for jet or beck dyeing, is illustrated as FIG. 8. Minor adjustments to FIG. 8 may be appropriate for package and beam dyeings. Because the copolyester fibers of the present invention begin to dye at 100° F., fabrics formed from the copolyester fibers should be home laundered in cold to warm water (i.e., less than 105° F.) to ensure that dyes from other fabrics do not stain the copolyester fabrics.

To evaluate the dyeing characteristic, the disperse dyeability of the PEG-modified copolyester was studied using Color Index Disperse Blue 56, 73, and 79. See Example 1 (below). These kinds of generic dyes, which are readily available, are representative low, medium, and high energy disperse dyes, respectively.

It will be understood by those of ordinary skill in the art that nonwoven fabrics will dye at least as well, if not better, than knit or woven fabrics. Accordingly, the following examples and data are relevant to dyeing nonwoven fabrics.

EXAMPLE 1

The copolyester fabric used in the testing was a 2×2 twill fabric using a 150 denier 100 filament count textured continuous filament yarn formed from copolyester fibers including between about 10 and 12 weight percent polyethylene glycol having a molecular weight of about 400 g/mol. A comparison fabric made of conventional polyester was also employed. This fabric was plain woven, 38×58 greige count with crimped polyethylene terephthalate filament yarn, and a fabric weight of 4.3 oz/sq.yd.

The copolyester fabric was washed according to AATCC Test Method 124-1996, on normal cycle, at 105° F. for eight minutes, to remove spin finishes and size materials. A pot dyeing method was used, wherein the liquor ratio was 10:1 and the fabric size was about 5"×12". Dyeing temperature was raised from ambient to 212° F. at a rate of 3° F./minute and held at 212° F. for 30 minutes with a dye concentration of 3 percent on weight of fabric (owf), unless otherwise stated. The conventional PET fabric was dyed at 265° F. for 30 minutes. Dyeing pH was adjusted by acetic acid and $Na_2CO_3/NaHCO_3$ buffer for the acidic and alkaline dyeing conditions, respectively. After dyeing, the fabrics were washed in a wash machine according to AATCC Test Method 124-1996, on normal cycle, at 105° F. for eight minutes, then tumble dried. After dyeing, the dye uptake was evaluated and compared by K/S values at the wavelength with maximum absorbency. This describes shade depth and is directly proportional to dye concentration on the fiber, provided the shade depth is not too high. Wash fastness was examined according to AATCC Test Method 61-2A(1996). Crock fastness was examined according to AATCC Test Method 8-1996.

Figure 9:
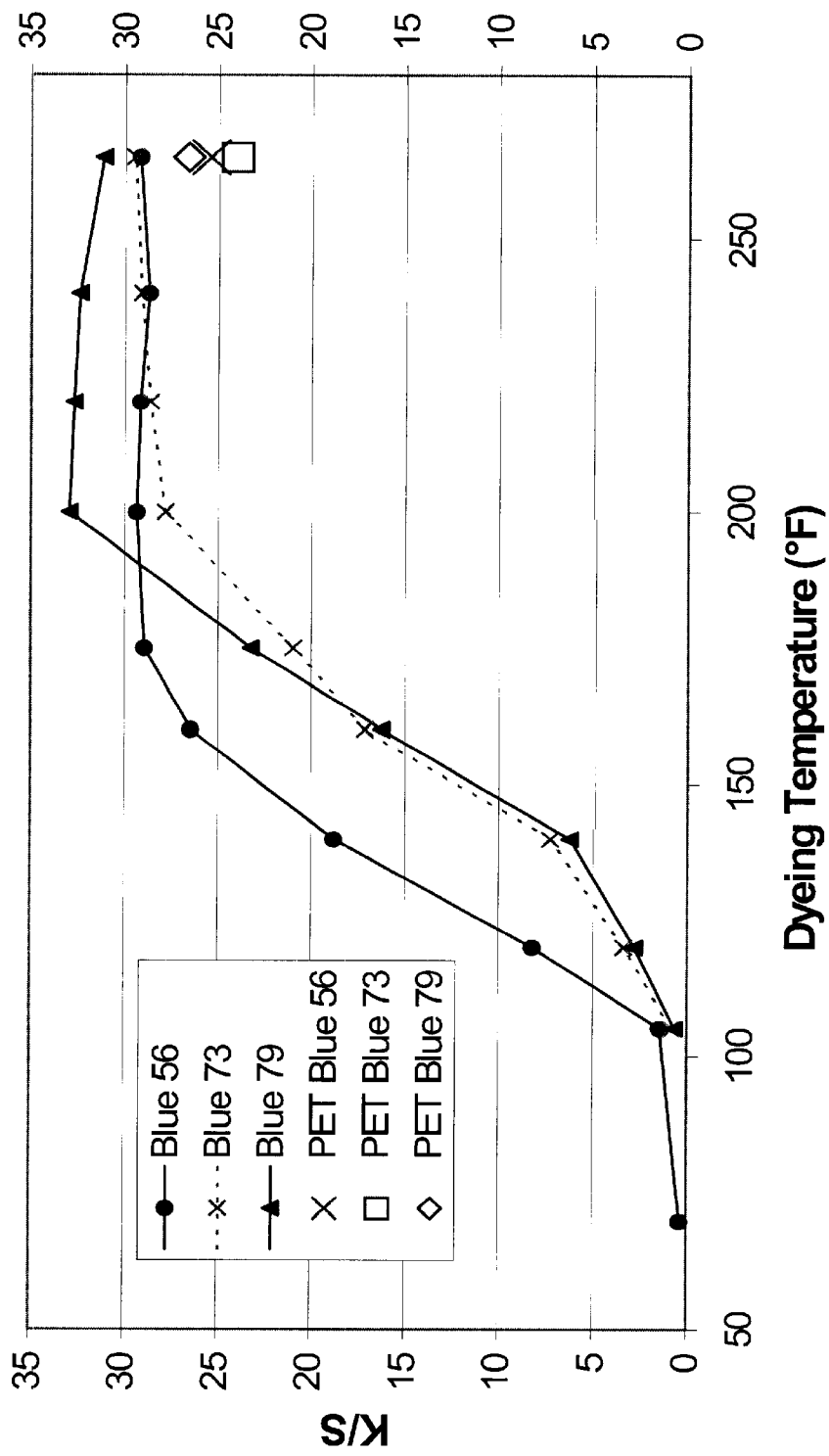
FIG. 9 describes the effect of temperature on uptake of low-energy, medium-energy, and high-energy dyes at a pH of about 5.

To evaluate temperature effects upon dyeing, fabrics were held at various temperatures for 60 minutes at a pH of 5. Thereafter, K/S values were measured. FIG. 9 describes the results. For the low-energy Disperse Blue 56, the optimal K/S value was achieved at 180° F. For the high-energy Disperse Blue 79, 200° F. provides excellent dye uptake. With respect to medium-energy Disperse Blue 73, dye uptake increased from 200° F. to 265° F., although the subsequent gain in dye uptake was minimal. For comparison, a conventional polyethylene terephthalate fabric was dyed at 265° F.

FIG. 9 shows that the copolyester fibers begin to dye at about 110° F. At 120° F., eight percent of the low-energy Disperse Blue 56 and three percent of the high-energy Disperse Blue 79 were sorbed. As disperse dyeing is a reversible sorption process, dyes being sorbed can also be de-sorbed if the temperature is high enough to open the fiber structure.

Figure 10:
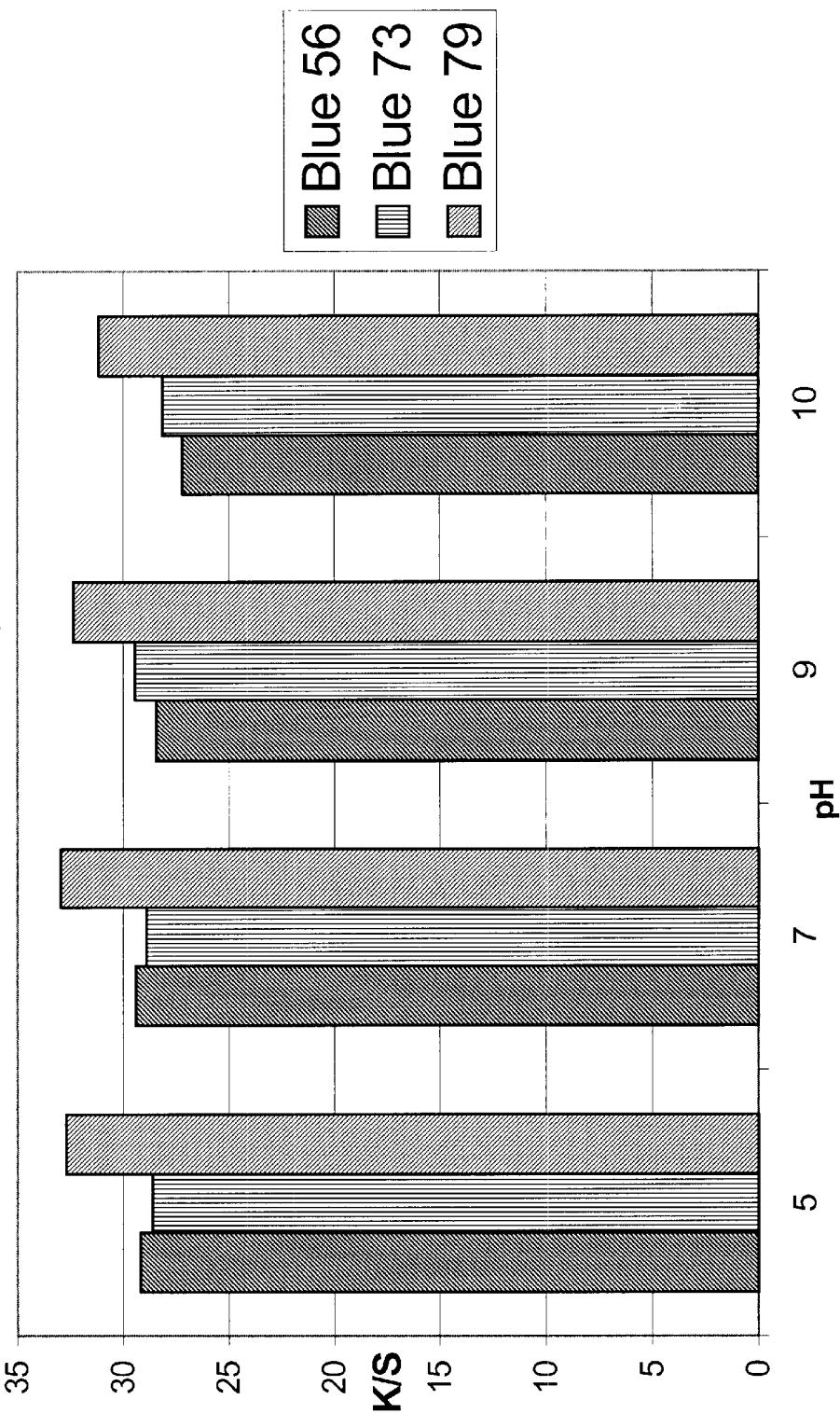
FIG. 10 describes the effect of pH upon low-energy, medium-energy, and high-energy disperse dyeing at 210° F.

FIG. 10 depicts the pH effects upon disperse dyeing at 210° F. This suggests that no pH adjustment is necessary when disperse dyeing the copolyester fibers at the aforementioned preferred temperatures (i.e., less than 212° F.). Interestingly, Disperse Blue 79, a dye that is sensitive to alkaline conditions, showed high stability at about a 10 pH.

Table 1 (below) describes laundering colorfastness of copolyester fabric dyed with low-energy, medium-energy, and high-energy disperse dyes at different shade depths (i.e., 0.5%, 1.2%, and 3.0% dye owf). As might be expected by one having ordinary skill in the art, wash fastness decreased with increasing shade depth and the high-energy dyes had better wash fastness than low-energy dyes.

In Tables 1 and 2 (below), AATCC Method 61-2A (1996), commonly referred to as a 2A wash test, was used to evaluate wash fastness. As will be known by those having ordinary skill in the art, Tables 1 and 2 refer to a 1–5 visual rating system, wherein 5 is best and 1 is worst.

TABLE 1

| Disperse Dye | Dye Conc (%) | K/S | Color Change | Multifiber | | | | | |
|---|---|---|---|---|---|---|---|---|---|
| | | | | Acetate | Cotton | Nylon | Polyester | Acrylic | Wool |
| Blue 56 | 0.5 | 9.36 | 4.5 | 3 | 4.5 | 2.5 | 4.5 | 5 | 4 |
| | 1.2 | 19.95 | 4.5 | 2 | 4.5 | 1.5 | 4 | 5 | 3.5 |
| | 3 | 28.31 | 4.5 | 2 | 4 | 1.5 | 4 | 5 | 3 |
| Blue 73 | 0.5 | 10.59 | 4.5 | 4 | 5 | 3 | 5 | 5 | 4.5 |
| | 1.2 | 21.02 | 4.5 | 3 | 4.5 | 2.5 | 4.5 | 5 | 4 |
| | 3 | 28.62 | 4.5 | 2.5 | 4.5 | 2 | 4 | 5 | 3.5 |
| Blue 79 | 0.5 | 7.17 | 4.5 | 5 | 5 | 4.5 | 5 | 5 | 4.5 |
| | 1.2 | 18.89 | 4.5 | 4.5 | 5 | 4 | 4.5 | 5 | 4.5 |
| | 3 | 32.84 | 4.5 | 3.5 | 4.5 | 3.5 | 3.5 | 5 | 4 |

Table 2 (below) describes colorfastness of laundered fabrics dyed at different temperatures. In general, higher dying temperatures do not improve wash fastness.

TABLE 2

| Disperse Dye | Dyeing Temp. °F. | K/S | Color Change | Multifiber | | | | | | Crocking | |
|---|---|---|---|---|---|---|---|---|---|---|---|
| | | | | Acetate | Cotton | Nylon | Polyester | Acrylic | Wool | Dry | Wet |
| Blue 56 | PET 265 | 25.45 | 4–5 | 3 | 4–5 | 2 | 4–5 | 5 | 4 | 4–5 | 4–5 |
| | 175 | 28.95 | 4–5 | 2 | 4 | 1–2 | 4 | 5 | 3 | 5 | 5 |
| | 200 | 29.35 | 4–5 | 2 | 4 | 1–2 | 4 | 5 | 3 | 5 | 5 |
| | 220 | 29.16 | 4–5 | 2 | 4 | 1–2 | 4 | 5 | 3 | 5 | 5 |
| | 240 | 28.70 | 4–5 | 2 | 4 | 1–2 | 4 | 5 | 3 | 5 | 5 |
| | 265 | 29.20 | 4–5 | 2 | 4 | 1–2 | 4 | 5 | 3 | 5 | 5 |
| Blue 73 | PET 265 | 24.02 | 4–5 | 3 | 4–5 | 2–3 | 4–5 | 5 | 4 | 4–5 | 4–5 |
| | 175 | 20.97 | | | | | | | | 5 | 4–5 |
| | 200 | 27.81 | 4–5 | 2–3 | 4–5 | 2 | 4 | 5 | 3–4 | 4–5 | 4–5 |
| | 220 | 28.62 | 4–5 | 2–3 | 4–5 | 2 | 4 | 5 | 3–4 | 4–5 | 4–5 |
| | 240 | 29.10 | 4–5 | 2–3 | 4–5 | 1–2 | 4 | 5 | 3–4 | 4–5 | 4–5 |
| | 265 | 29.48 | 4–5 | 2 | 4 | 1–2 | 4 | 5 | 3–4 | 4–5 | 4–5 |
| Blue 79 | PET 265 | 26.63 | 4–5 | 2 | 4 | 3 | 3 | 5 | 3–4 | 4 | 4 |
| | 175 | 23.26 | | | | | | | | 5 | 5 |
| | 200 | 32.94 | 4–5 | 3–4 | 4–5 | 3–4 | 3–4 | 5 | 4 | 5 | 5 |
| | 220 | 32.70 | 4–5 | 3–4 | 4–5 | 3–4 | 3–4 | 5 | 4 | 5 | 5 |
| | 240 | 32.41 | 4–5 | 3–4 | 4–5 | 3–4 | 3–4 | 5 | 4 | 5 | 5 |
| | 265 | 31.14 | 4–5 | 3–4 | 4–5 | 3–4 | 3–4 | 5 | 4 | 5 | 5 |

The copolyester fiber produced according to the present invention had comparable wash fastness to that of conventional polyester fiber dyed at 265° F. (i.e., PET 265). Note, however, that the low-energy disperse dye resulted in poorer wash fastness as compared to the results using the high-energy disperse dye. Accordingly, lower-energy dyes might be better employed where good light fastness is required, but wash fastness is not required (e.g., automotive fabrics). The copolyester fiber had better crock fastness than the conventional polyester fiber in most cases. The copolyester also had better wash fastness than the conventional polyester when using the high-energy dye Color Index Blue 79.

Moreover, it has been further observed that fabrics formed according to the present invention possess significantly improved hand (i.e., tactile qualities) as compared to conventional polyester fabrics made of fibers having similar denier per filament (dpf). In this regard, 1.5 dpf copolyester fibers of the present invention are comparable to 0.6–0.75 dpf conventional polyester fibers.

Figure 11:
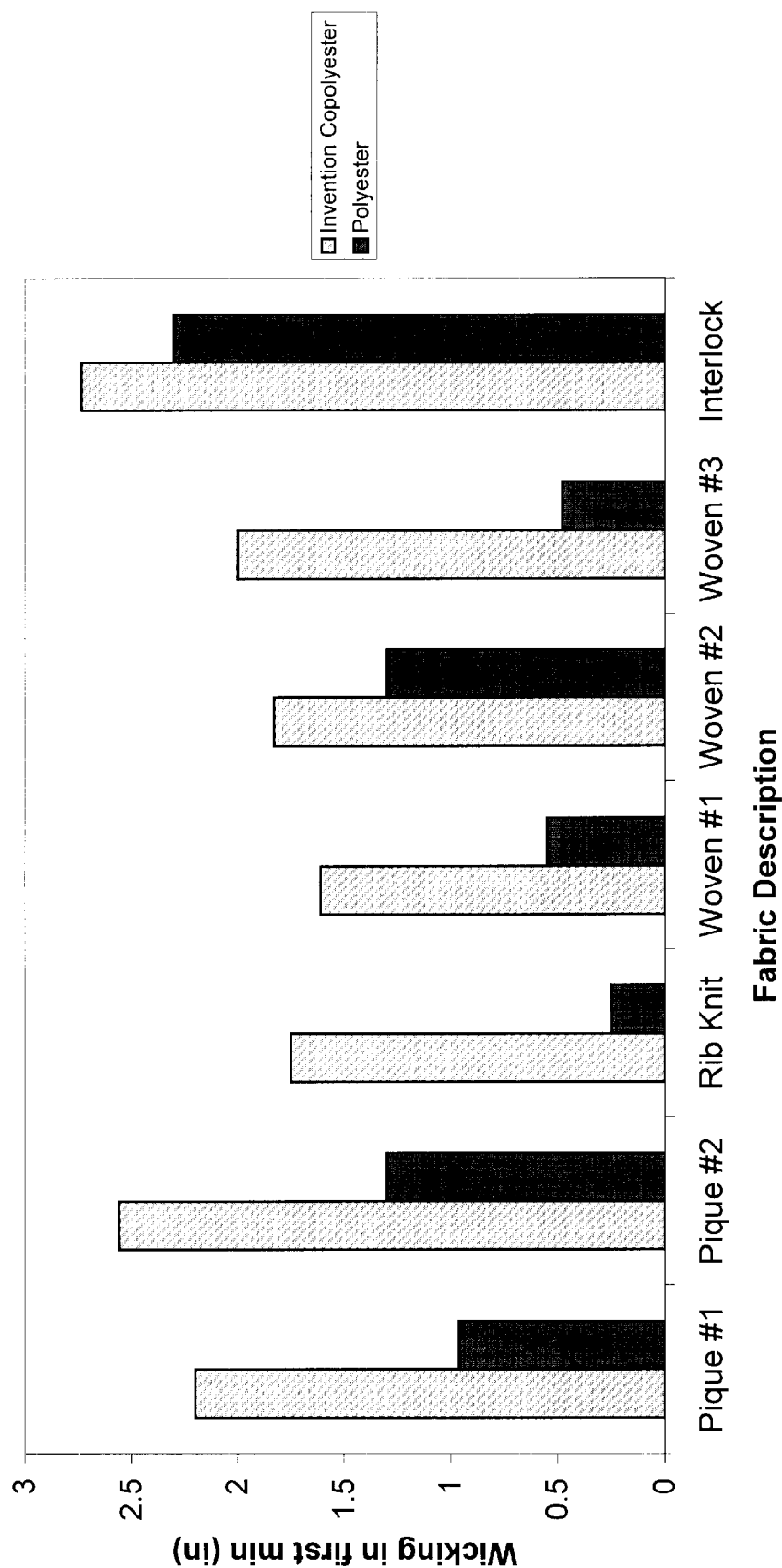
FIG. 11 describes the wicking properties of fabrics formed from copolyester fibers produced according to the invention as compared to the wicking properties of fabrics formed from conventional, unmodified polyethylene terephthalate fibers.

FIG. 11 describes the wicking properties of fabrics formed from copolyester fibers produced according to the invention as compared to the wicking properties of fabrics formed from conventional, unmodified polyethylene terephthalate fibers. As noted, the copolyester fibers included between about 10 and 12 weight percent polyethylene glycol having a molecular weight of about 400 g/mol. Wicking properties were measured using one-inch by seven-inch strips that were suspended vertically above water-filled beakers and then submersed one inch below the water surface. After one minute, the water migration up the test strips was measured. The fabrics were tested in both fabric directions and averaged. The test strip fabrics were laundered once before testing. The room conditions were ASTM standard 21° C. and 65 percent relative humidity.

Figure 12:
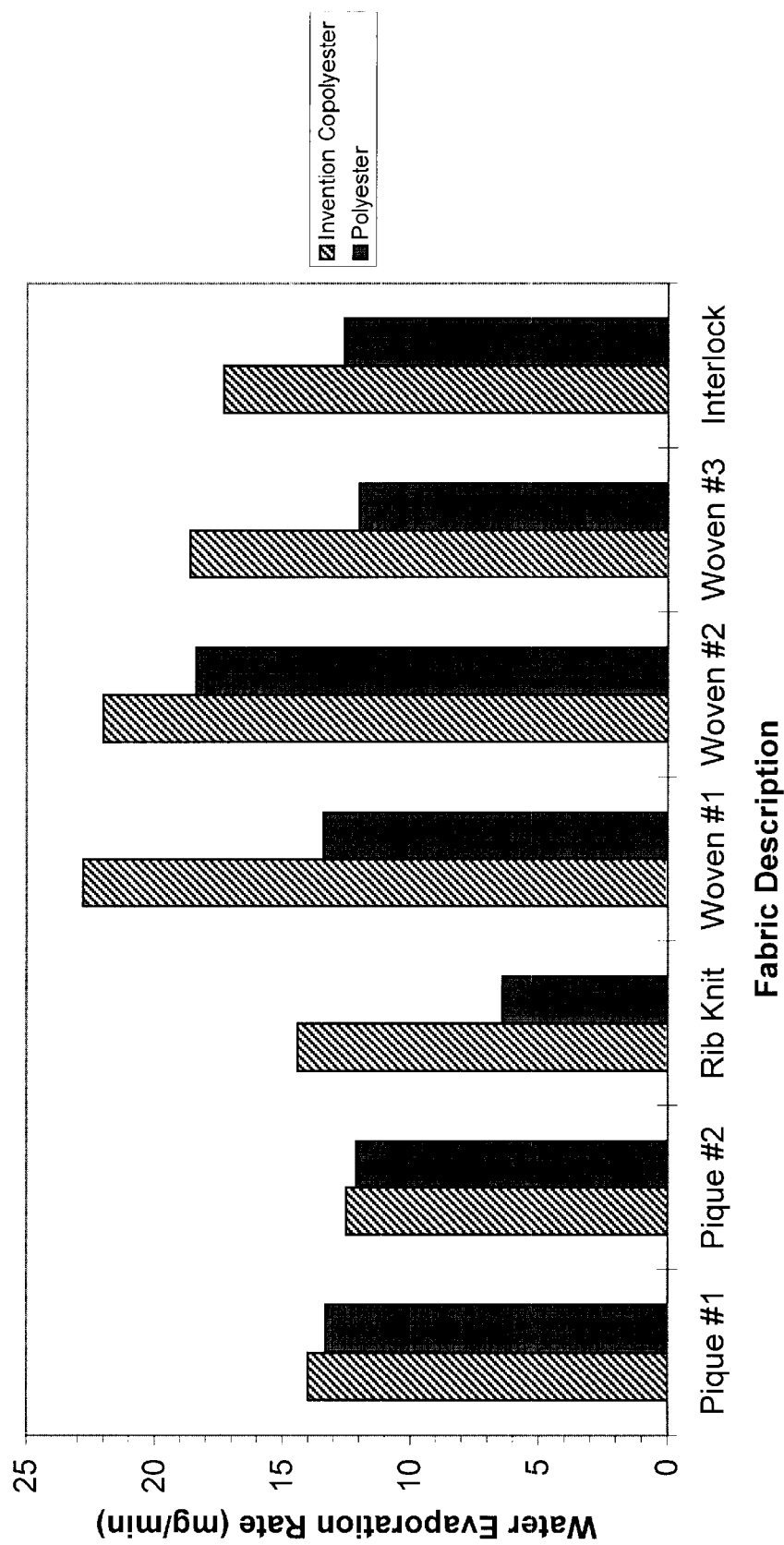
FIG. 12 describes the drying properties of fabrics formed from copolyester fibers produced according to the present invention as compared to the drying properties of fabrics formed from conventional, unmodified polyethylene terephthalate fibers.

FIG. 12 describes the drying properties of fabrics formed from copolyester fibers produced according to the present invention as compared to the drying properties of fabrics formed from conventional, unmodified polyethylene terephthalate fibers. As noted, the copolyester fibers included between about 10 and 12 weight percent polyethylene glycol having a molecular weight of about 400 g/mol. Drying rate was determined using a Sartorius MA30-000V3 at 40° C. Two or three drops of water were placed on the fabrics. Then, the evaporation time was measured and an evaporation rate was calculated. The room conditions were ASTM standard 21° C. and 65 percent relative humidity.

Figure 13:
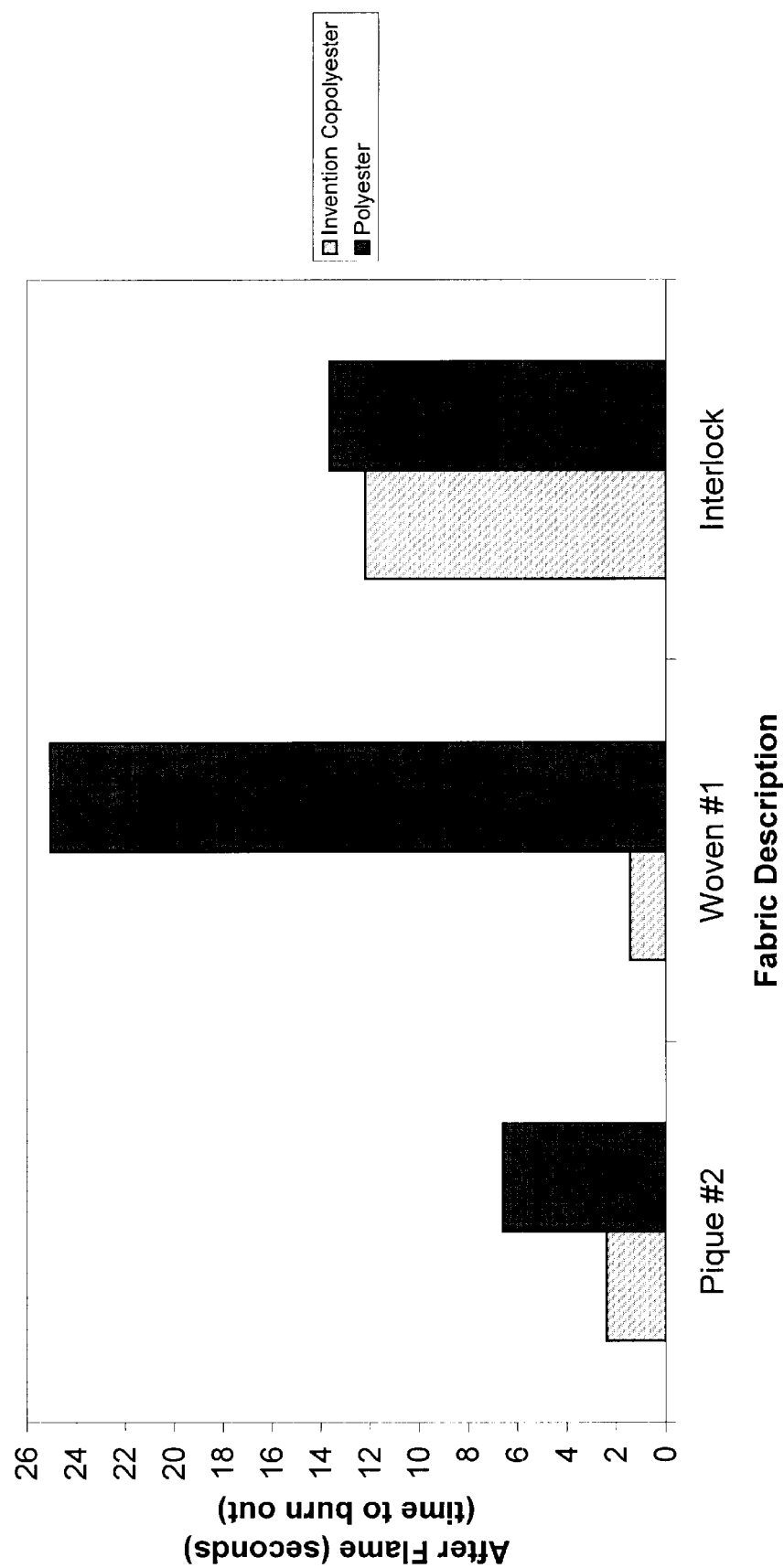
FIG. 13 describes the flame-retardancy properties of fabrics formed from copolyester fibers produced according to the invention as compared to the flame-retardancy properties of fabrics formed from conventional, unmodified polyethylene terephthalate fibers.

FIG. 13 describes the flame-retardancy properties of fabrics formed from copolyester fibers produced according to the invention as compared to the flame-retardancy properties of fabrics formed from conventional, unmodified polyethylene terephthalate fibers. As noted, the copolyester fibers included between about 10 and 12 weight percent polyethylene glycol having a molecular weight of about 400 g/mol. The testing was performed in accordance with the NFPA 701 Method small-scale-after-flame test. FIG. 13 merely shows that fabrics formed from copolyester fibers produced according to the invention have better flame-retardancy properties as compared to those of fabrics formed from conventional, unmodified polyethylene terephthalate fibers. FIG. 13 is not intended to imply that fabrics formed from copolyester fibers produced according to the invention will meet any particular government flammability standards.

Figure 14:
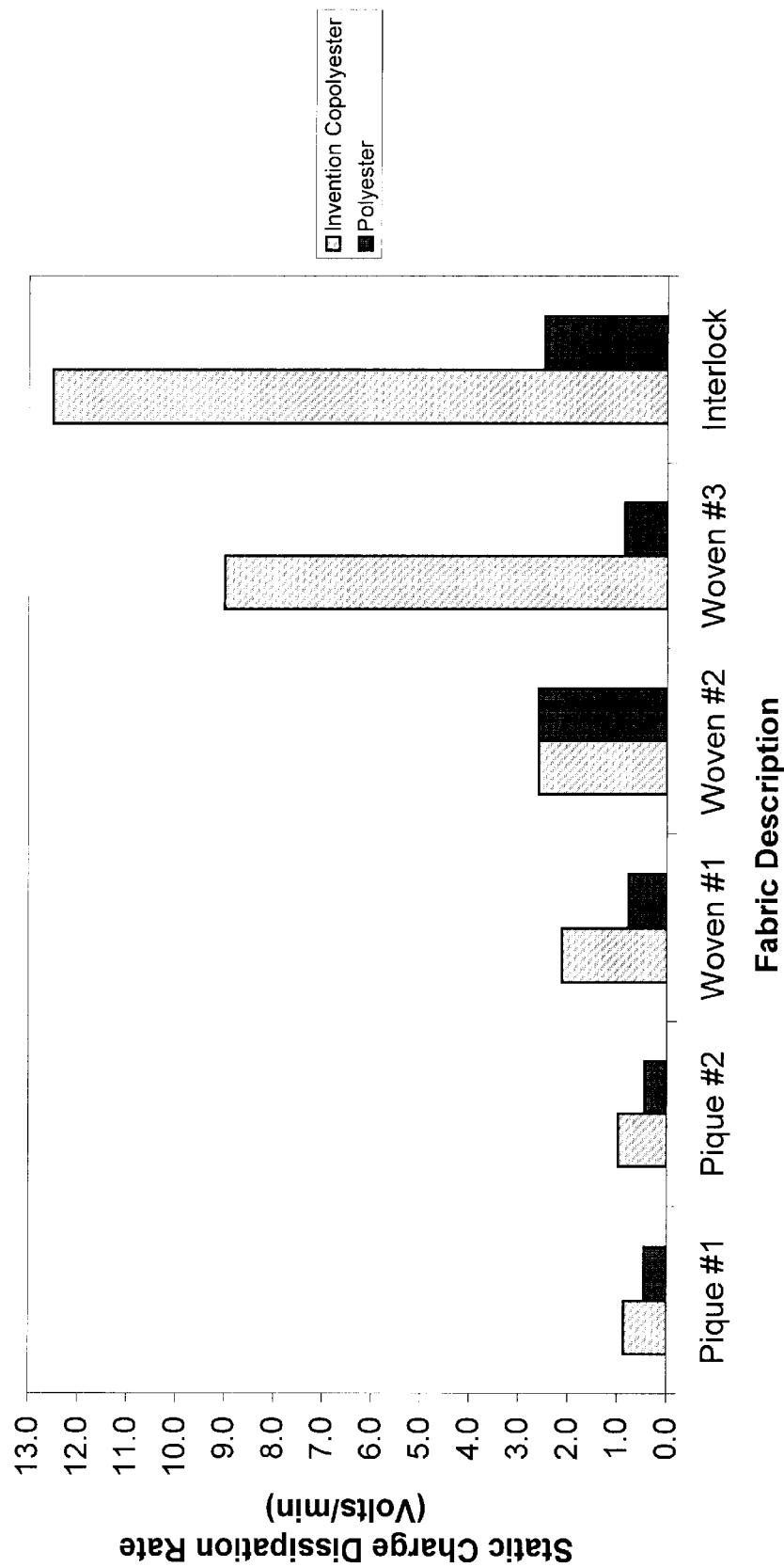
FIG. 14 describes the static-dissipation properties of fabrics formed from copolyester fibers produced according to the invention as compared to the static-dissipation properties of fabrics formed from conventional, unmodified polyethylene terephthalate fibers.

Unlike conventional unmodified polyester fibers, the copolyester fibers formed according to the present method possess static-dissipation properties that are closer to that of cotton. FIG. 14 describes the static-dissipation properties of fabrics formed from copolyester fibers produced according to the invention as compared to the static-dissipation properties of fabrics formed from conventional, unmodified polyethylene terephthalate fibers. As noted, the copolyester fibers included between about 10 and 12 weight percent polyethylene glycol having a molecular weight of about 400 g/mol. Static dissipation was determined using a Rothschild Static-Voltmeter R-4021. In brief, fabric was mounted between the electrodes, and then the time for the voltage across the fabric to reduce from 150 volts to 75 volts was measured. The room conditions were ASTM standard 21° C. and 65 percent relative humidity. As will be understood by those having ordinary skill in the art, a shorter charge half-life is desirable in fabrics because it means fabric static is dissipated faster.

Figure 15:
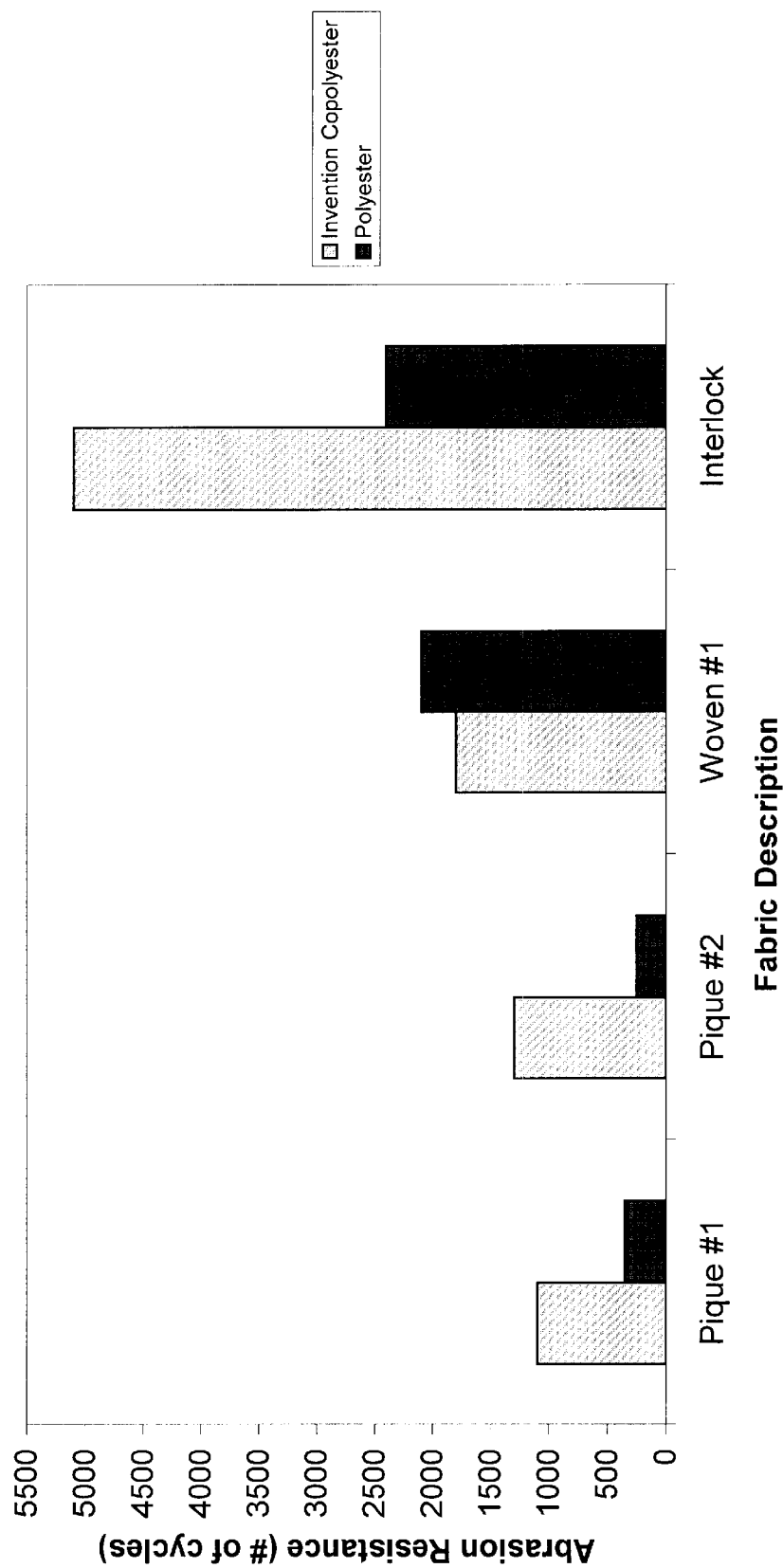
FIG. 15 describes the abrasion resistance properties of fabrics formed from copolyester fibers produced according to the invention as compared to the abrasion resistance properties of fabrics formed from conventional, unmodified polyethylene terephthalate fibers.

FIG. 15 describes the abrasion resistance properties of fabrics formed from copolyester fibers produced according to the invention as compared to the abrasion resistance properties of fabrics formed from conventional, unmodified polyethylene terephthalate fibers. As noted, the copolyester fibers included between about 10 and 12 weight percent polyethylene glycol having a molecular weight of about 400 g/mol. The fabrics each had a TiO2 level of 3000 ppm. Abrasion resistance was determined using Stoll flat (knits) ASTM D 3886 method and Taber (wovens) ASTM D 3884 method.

Figure 16:
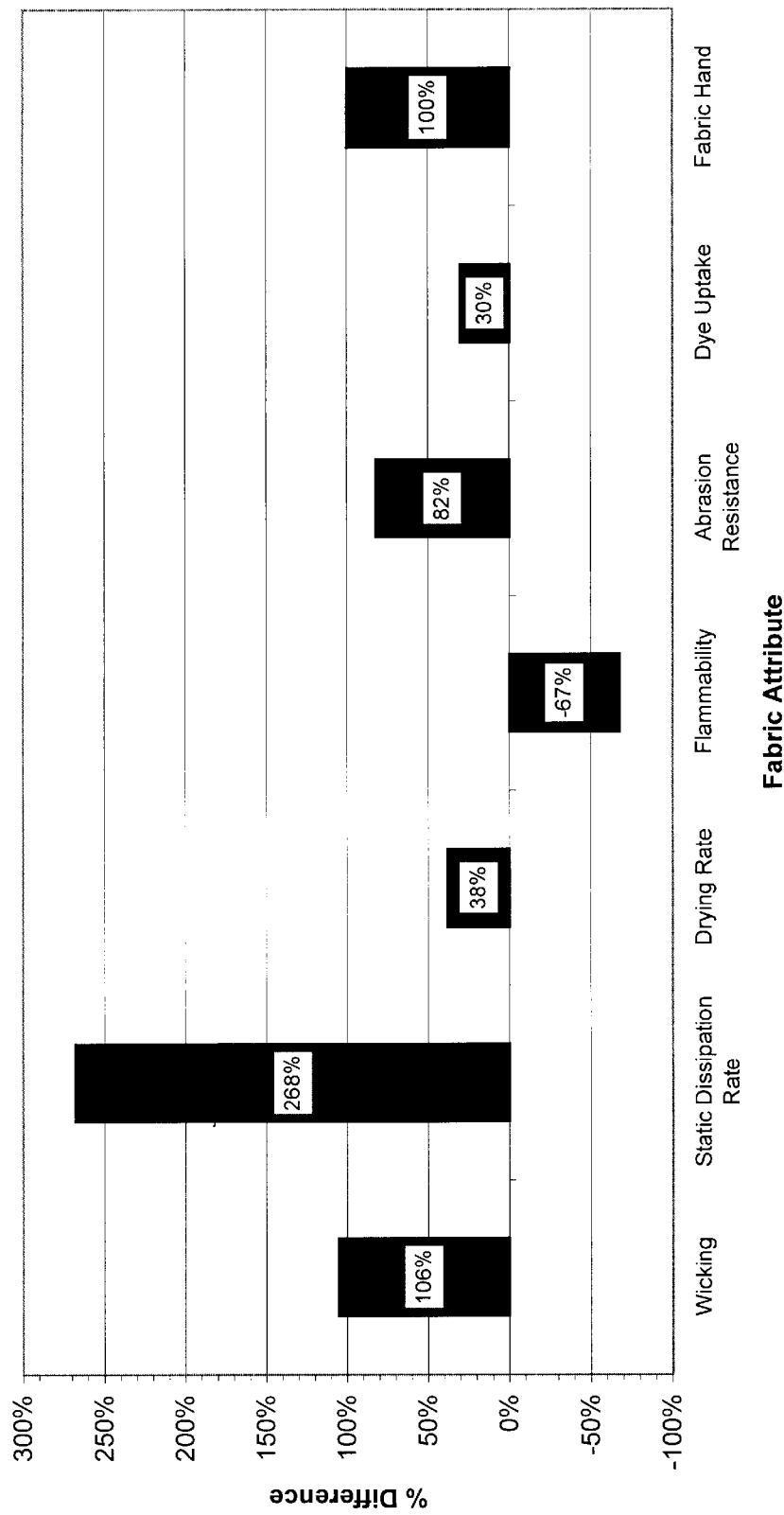
FIG. 16 describes the improved properties of fabrics formed from copolyester fibers produced according to the invention as compared to the properties of fabrics formed from conventional, unmodified polyethylene terephthalate fibers.

FIG. 16 summarizes on a percentage basis the improved properties of fabrics formed from copolyester fibers produced according to the invention as compared to the properties of fabrics formed from conventional, unmodified polyethylene terephthalate fibers. As noted, the copolyester fibers included between about 10 and 12 weight percent polyethylene glycol having a molecular weight of about 400 g/mol. With respect to dye uptake, the 30 percent improvement is based on darker shades. With respect to fabric hand, fabric formed from 1.5 dpf copolyester fibers according to the present invention subjectively feels like fabric formed from 0.75 dpf conventional polyester microfibers.

Preparing PEG-modified copolyester fibers according to the invention not only yields certain improved textile characteristics, but also facilitates the retention of the desirable dimensional stability of ordinary polyester. Despite the significant concentration of polyethylene glycol, copolyester fibers prepared according to the invention have dimensional stability properties, especially shrinkage during home laundering, that are substantially similar to those of conventional polyethylene terephthalate fibers. For example, conventional polyester fabric exhibits less than about five percent shrinkage in home laundering if finished at a temperature at or above 350° F. Similarly, copolyester fabric of the invention exhibits less than about five percent shrinkage in home laundering if finished (i.e., heat set) at a fabric temperature at or above 330° F. This is about the expected home laundering shrinkage of conventional polyester fabrics.

Moreover, fabrics formed from the filaments spun according to the invention will possess better elastic-memory properties (i.e., stretch and recovery) as compared to fabrics formed from conventional polyethylene terephthalate filaments. Open fabric constructions tend to accentuate moisture movement and stretch performance.

Conventional techniques of polymerizing polyester and spinning filaments are well known by those having ordinary skill in the art. Accordingly, the following examples highlight the modifications to conventional process steps to achieve an especially desirable fabric.

EXAMPLE 2

Melt Polymerization—The copolyester composition was polymerized like standard polyethylene terephthalate, except that the polymerization temperature was 10° C. lower than normal. Polyethylene glycol, having an average molecular weight of 400 g/mol, was injected into the process before the initiation of the polymerization at a rate sufficient to yield ten weight percent polyethylene glycol in the copolyester composition. Likewise, pentaerthyritol was added before polymerization at a rate that would yield about 500 ppm in the copolyester composition. The copolyester was then extruded, quenched, and cut. The quench water was 10° C. colder than normal. The copolyester was crystallized 10° C. lower than normal. The copolyester was melt polymerized to an intrinsic viscosity of 0.62 dl/g.

Solid State Polymerization—The copolyester chip was solid state polymerized like a typical polyethylene terephthalate bottle resin chip except that the chip was maintained at 190° C. for five hours. The intrinsic viscosity of the copolyester chip was increased in the solid phase to about 0.77 dl/g.

Fiber Production—The copolyester formed staple fibers like a conventional polyethylene terephthalate product having the same fiber denier, except that the spinning speed was reduced by seven percent and the spinning temperature was reduced by 15° C. The drawing temperature was reduced approximately 15° C. below that of normal polyester and the heat-setting temperature was reduced by 30° C.

Nonwoven Fabric Formation—Carding was the same as for conventional polyester. Fabric formation was identical to conventional techniques, except that the optimum calendar bonding temperature was reduced by 20° C. to 40° C. Hydroentangling, needlepunching, stitch-bonding, and through-air bonding (in the presence of low-melt binder fibers) methods may be the same as used on normal polyester fibers.

EXAMPLE 3

Melt Polymerization—The copolyester composition was polymerized like standard polyethylene terephthalate, except that the polymerization temperature was 10° C. lower than normal. Polyethylene glycol, having an average molecular weight of 400 g/mol, was injected into the process before the initiation of the polymerization at a rate sufficient to yield ten weight percent polyethylene glycol in the copolyester composition. Likewise, pentaerthyritol was added before polymerization at a rate that would yield about 400 ppm in the copolyester composition. The copolyester was then extruded, quenched, and cut. The quench water was 10° C. colder than normal. The copolyester was crystallized 10° C. lower than normal. The copolyester was melt polymerized to an intrinsic viscosity of 0.78 dl/g.

Fiber Production—The copolyester formed staple fibers like a conventional polyethylene terephthalate product having the same filament count, except that the spinning temperature was reduced by 15° C. The drawing temperature was reduced by approximately 15° C. below that of conventional polyester and the heat-setting temperature was reduced by 30° C.

Nonwoven Fabric Formation—Carding was the same as for regular polyester. Fabric formation was identical to conventional techniques except that the optimum calendar bonding temperatures was reduced by 20° C. to 40° C. Hydroentangling, needlepunching, stitch-bonding, and through-air bonding (in the presence of low-melt binder fibers) methods may be the same as used on normal polyester fibers.

Dyeing—Dyeing was the same as conventional techniques except that no carrier was used and the batch was held at a dye temperature of 210° F. for 30 minutes. The heat-up rate was held to 2° F. per minute between 110° F. and 210° F. to ensure level dyeing.

Finishing—Finishing was the same as conventional techniques except that the zone temperature was reduced 10° C. and no finish was used in the pad.

In the drawings and the specification, typical embodiments of the invention have been disclosed. Specific terms have been used only in a generic and descriptive sense, and not for purposes of limitation. The scope of the invention is set forth in the following claims.

That which is claimed is:

1. A nonwoven fabric formed of polyethylene glycol modified copolyester staple fibers that provide exceptional moisture management characteristics, said copolyester staple fibers comprising:

polyethylene terephthalate in an amount sufficient for said copolyester staple fibers to possess dimensional stability properties substantially similar to those of conventional, unmodified polyethylene terephthalate fibers;

polyethylene glycol in an amount sufficient for said copolyester staple fibers to possess wicking characteristics that are superior to those of conventional, unmodified polyethylene terephthalate fibers; and chain branching agent in an amount less than about 0.0014 mole-equivalent branches per mole of standardized polymer, the standardized polymer being unmodified polyethylene terephthalate;

wherein said copolyester staple fibers have a mean intrinsic viscosity of at least about 0.67 dl/g.

2. A nonwoven fabric according to claim 1, wherein said copolyester staple fibers comprise polymer chains formed from structural units consisting essentially of either diol monomers and aromatic non-substituted diacid monomers, or diol monomers, aromatic non-substituted diacid monomers, and branching agent monomers.

3. A nonwoven fabric according to claim 1, wherein the weight fraction of the polyethylene glycol in said copolyester staple fibers is between about 4 percent and 20 percent.

4. A nonwoven fabric according to claim 1, wherein the weight fraction of the polyethylene glycol in said copolyester staple fibers is between 4 percent and 6 percent.

5. A nonwoven fabric according to claim 1, wherein the weight fraction of the polyethylene glycol in said copolyester staple fibers is between 10 percent and 20 percent.

6. A nonwoven fabric according to claim 1, wherein the weight fraction of the polyethylene glycol in said copolyester staple fibers is between about 15 percent and 20 percent.

7. A nonwoven fabric according to claim 1, wherein the polyethylene glycol has an average molecular weight less than about 5000 g/mol.

8. A nonwoven fabric according to claim 1, wherein the polyethylene glycol has an average molecular weight of between about 300 g/mol and 1000 g/mol.

9. A nonwoven fabric according to claim 1, wherein the polyethylene glycol has an average molecular weight of about 400 g/mol.

10. A nonwoven fabric according to claim 1, wherein said copolyester staple fibers have a mean intrinsic viscosity of at least about 0.73 dl/g.

11. A nonwoven fabric according to claim 1, wherein said copolyester staple fibers have a mean intrinsic viscosity of at least about 0.80 dl/g.

12. A nonwoven fabric according to claim 1, wherein the weight fraction of polyethylene glycol in said copolyester staple fibers and the mean intrinsic viscosity of said copolyester staple fibers are defined by the shaded region of FIG. 1.

13. A nonwoven fabric according to claim 1, wherein:
the weight fraction of polyethylene glycol in said copolyester staple fibers is between 10 and 15 percent; and
said copolyester staple fibers have a mean intrinsic viscosity of between about 0.73 and 0.93 dl/g.

14. A nonwoven fabric according to claim 1, wherein:
the weight fraction of polyethylene glycol in said copolyester staple fibers is about 5 percent; and
said copolyester staple fibers have a mean intrinsic viscosity of at least about 0.67 dl/g.

15. A nonwoven fabric according to claim 1, wherein the chain branching agent, if present, is present in an amount less than about 0.0003 mole-equivalent branches per mole of standardized polymer.

16. A nonwoven fabric according to claim 1, wherein the chain branching agent is present in an amount between about 0.0003 and 0.0014 mole-equivalent branches per mole of standardized polymer.

17. A nonwoven fabric according to claim 1, wherein the weight fraction of the polyethylene glycol in said copolyester staple fibers is between about 10 percent and 12 percent and the chain branching agent is present in an amount between about 0.0003 and 0.0014 mole-equivalent branches per mole of standardized polymer.

18. A nonwoven fabric according to claim 1, wherein said copolyester staple fibers have a mean tenacity of less than 3 grams per denier.

19. A nonwoven fabric according to claim 1, wherein the chain branching agent is capable of copolymerizing with polyethylene terephthalate, the chain branching agent being selected from the group consisting of trifunctional alcohols, trifunctional acids, tetrafunctional alcohols, tetrafunctional acids, pentafunctional alcohols, pentafunctional acids, hexafunctional alcohols, and hexafunctional acids.

20. A nonwoven fabric according to claim 1, wherein the chain branching agent is selected from the group consisting of pentaerythritol, dipentaerythritol, trimesic acid, pyromellitic acid, pyromellitic dianhydride, trimellitic acid, trimellitic anhydride, trimethylol propane, and ditrimethylol propane.

21. A nonwoven fabric according to claim 1, wherein the chain branching agent consists essentially of pentaerythritol that is present in said copolyester staple fibers in an amount between about 110 and 500 ppm.

22. A nonwoven fabric according to claim 1, wherein the nonwoven fabric possesses improved wicking characteristics as compared to a nonwoven fabric formed of a similar percentage of conventional, unmodified polyethylene terephthalate fibers.

23. A nonwoven fabric according to claim 1, wherein the nonwoven fabric is a calendar-bonded nonwoven fabric.

24. A nonwoven fabric according to claim 1, wherein the nonwoven fabric is a hydroentangled nonwoven fabric.

25. A nonwoven fabric according to claim 1, wherein the nonwoven fabric is a through-air-bonded nonwoven fabric.

26. A nonwoven fabric according to claim 1, wherein the nonwoven fabric is a needlepunched nonwoven fabric.

27. A nonwoven fabric according to claim 1, wherein the nonwoven fabric is a stitch-bonded nonwoven fabric.

28. A nonwoven fabric according to claim 1, wherein the nonwoven fabric is a melt spun-bonded nonwoven fabric.

29. A nonwoven fabric according to claim 1, wherein the nonwoven fabric is a melt-blown nonwoven fabric.

30. A disposable wipe comprising the nonwoven fabric of claim 1.

31. A disposable undergarment comprising the nonwoven fabric of claim 1.

32. A durable good comprising the nonwoven fabric of claim 1, said durable good possessing the appearance and performance of a traditional textile good.

33. A method of dyeing the nonwoven fabric of claim 1, comprising dyeing the nonwoven fabric at a temperature of less than about 240° F.

34. A method of dyeing the nonwoven fabric of claim 1, comprising dyeing the nonwoven fabric at a temperature of less than about 220° F.

35. A method of dyeing the nonwoven fabric of claim 1, comprising dyeing the nonwoven fabric at or below a temperature defined by the boiling point of water at atmospheric pressure.

36. A method of dyeing the nonwoven fabric of claim 1, comprising dyeing the nonwoven fabric between about 200° F. and 212° F. using a high-energy dye.

37. A method of dyeing the nonwoven fabric of claim 1, comprising dyeing the nonwoven fabric between about 180° F. and 200° F. using a low-energy dye.

38. A nonwoven fabric according to claim 1, wherein said nonwoven fabric is a blended nonwoven fabric comprising a second kind of fiber.

39. A nonwoven fabric according to claim 38, wherein said second kind of fiber is selected from the group consisting of cotton fibers, rayon fibers, polypropylene fibers, acetate fibers, nylon fibers, spandex fibers, and conventional polyester fibers.

40. A nonwoven fabric according to claim 38, wherein said second kind of fiber comprises cellulosic fibers.

41. A nonwoven fabric according to claim 40, wherein the cellulosic fibers comprise rayon fibers that are present in the nonwoven fabric in an amount sufficient to provide excellent absorbency, and the copolyester fibers are present in the nonwoven fabric in an amount sufficient to provide excellent wickability.

42. A nonwoven fabric according to claim 38, wherein said second kind of fiber comprises biconstituent fibers.

43. A nonwoven fabric according to claim 42, wherein the biconstituent fibers comprise a polyester core surrounded by a sheath of either polypropylene or low-melt polyester.

44. A nonwoven fabric according to claim 38, wherein the nonwoven fabric possesses an improved ability to retain its wicking characteristics even after several liquid insults, as compared to a nonwoven fabric formed of an equivalent fraction of conventional, unmodified polyethylene terephthalate fibers.

45. A nonwoven fabric according to claim 38, wherein the nonwoven fabric possesses improved dyeing characteristics as compared to a nonwoven fabric formed of an equivalent fraction of conventional, unmodified polyethylene terephthalate fibers.

46. A nonwoven fabric formed of polyethylene glycol modified copolyester staple fibers that provide exceptional moisture management characteristics, said copolyester staple fibers comprising:

polyethylene terephthalate in an amount sufficient for said copolyester staple fibers to possess dimensional stability properties substantially similar to those of conventional, unmodified polyethylene terephthalate fibers;

polyethylene glycol in an amount sufficient for said copolyester staple fibers to possess wicking characteristics that are superior to those of conventional, unmodified polyethylene terephthalate fibers, wherein the polyethylene glycol has an average molecular weight less than about 5000 g/mol; and chain branching agent in an amount less than about 0.0014 mole-equivalent branches per mole of standardized polymer, the standardized polymer being unmodified polyethylene terephthalate;

wherein said copolyester staple fibers comprise polymer chains formed from structural units consisting essentially of either diol monomers and aromatic non-substituted diacid monomers, or diol monomers, aromatic non-substituted diacid monomers, and branching agent monomers; and wherein said copolyester staple fibers have a mean intrinsic viscosity of at least about 0.67 dl/g.

47. A nonwoven fabric according to claim 46, wherein the weight fraction of the polyethylene glycol in said copolyester staple fibers is between about 4 percent and 20 percent.

48. A nonwoven fabric according to claim 46, wherein the weight fraction of the polyethylene glycol in said copolyester staple fibers is between 4 percent and 6 percent.

49. A nonwoven fabric according to claim 46, wherein the weight fraction of the polyethylene glycol in said copolyester staple fibers is between 10 percent and 20 percent.

50. A nonwoven fabric according to claim 46, wherein the weight fraction of the polyethylene glycol in said copolyester staple fibers is between about 10 percent and 12 percent.

51. A nonwoven fabric according to claim 46, wherein the polyethylene glycol has an average molecular weight of between about 300 g/mol and 1000 g/mol.

52. A nonwoven fabric according to claim 46, wherein the polyethylene glycol has an average molecular weight of about 400 g/mol.

53. A nonwoven fabric according to claim 46, wherein said copolyester staple fibers have a mean intrinsic viscosity of at least about 0.73 dl/g.

54. A nonwoven fabric according to claim 46, wherein said copolyester staple fibers have a mean intrinsic viscosity of at least about 0.80 dl/g.

55. A nonwoven fabric according to claim 46, wherein said copolyester staple fibers have a mean tenacity of less than 3 grams per denier.

56. A method of dyeing the nonwoven fabric of claim 46, comprising dyeing the nonwoven fabric at a temperature of less than about 240° F.

57. A method of dyeing the nonwoven fabric of claim 46, comprising dyeing the nonwoven fabric at a temperature of less than about 220° F.

58. A method of dyeing the nonwoven fabric of claim 46, comprising dyeing the nonwoven fabric at or below a temperature defined by the boiling point of water at atmospheric pressure.

59. A method of making a nonwoven fabric having exceptional wicking characteristics, comprising:

copolymerizing polyethylene glycol and chain branching agent into polyethylene terephthalate in the melt phase to form a copolyester composition that comprises polymer chains formed from structural units consisting essentially of diol monomers, aromatic non-substituted diacid monomers, and branching agent monomers, and that has an intrinsic viscosity of at least about 0.67 dl/g;

wherein the polyethylene terephthalate is present in the copolyester composition in an amount sufficient for fibers made from the copolyester composition to possess dimensional stability properties substantially similar to those of conventional, unmodified polyethylene terephthalate fibers;

wherein the polyethylene glycol has an average molecular weight of less than about 5000 g/mol and is present in an amount sufficient for fibers made from the copolyester composition to possess wicking characteristics that are superior to those of conventional, unmodified polyethylene terephthalate fibers; and wherein the chain branching agent is present in the copolyester composition in an amount less than about 0.0014 mole-equivalent branches per mole of standardized polymer, the standardized polymer being unmodified polyethylene terephthalate;

thereafter spinning the copolyester composition into copolyester filaments;

forming the copolyester filaments into staple fibers; and forming the copolyester staple fibers into a nonwoven fabric.

60. A method of making a nonwoven fabric according to claim 59, wherein the step of copolymerizing polyethylene glycol and chain branching agent into polyethylene terephthalate in the melt phase comprises reacting in the melt phase ethylene glycol and a reactant selected from the group consisting of terephthalic acid and dimethyl terephthalate in the presence of polyethylene glycol and branching agent, wherein the weight fraction of polyethylene glycol in the resulting copolyester composition is between about 4 percent and 20 percent.

61. A method of making a nonwoven fabric according to claim 59, wherein the chain branching agent is present in the copolyester composition in an amount between about 0.0003 and 0.0014 mole-equivalent branches per mole of standardized polymer.

62. A method of making a nonwoven fabric according to claim 59, wherein the weight fraction of polyethylene glycol in the copolyester composition and the intrinsic viscosity of the copolyester composition after melt phase polymerization are defined by the shaded region of FIG. 1.

63. A method of making a nonwoven fabric according to claim 59, wherein the weight fraction of polyethylene glycol in the copolyester composition is between about 4 percent and 20 percent.

64. A method of making a nonwoven fabric according to claim 59, wherein the weight fraction of polyethylene glycol in the copolyester composition is between about 4 percent and 6 percent.

65. A method of making a nonwoven fabric according to claim 59, wherein the weight fraction of polyethylene glycol in the copolyester composition is between about 10 percent and 20 percent.

66. A method of making a nonwoven fabric according to claim 59, wherein the polyethylene glycol has an average molecular weight of between about 200 g/mol and 5000 g/mol.

67. A method of making a nonwoven fabric according to claim 59, wherein the polyethylene glycol has an average molecular weight of between about 300 g/mol and 1000 g/mol.

68. A method of making a nonwoven fabric according to claim 59, wherein the polyethylene glycol has an average molecular weight of between about 400 g/mol.

69. A method of making a nonwoven fabric according to claim 59, wherein the copolyester composition has an intrinsic viscosity of at least about 0.73 dl/g.

70. A method of making a nonwoven fabric according to claim 59, wherein the copolyester composition has an intrinsic viscosity of at least about 0.80 dl/g.

71. A method of making a nonwoven fabric according to claim 59, wherein the step of spinning the copolyester composition into filaments comprises spinning filaments having a mean tenacity of less than 3 grams per denier.

72. A method of making a nonwoven fabric according to claim 59, wherein the step of forming the copolyester fibers into a nonwoven fabric comprises forming the copolyester staple fibers and a second kind of fiber into a nonwoven fabric.

73. A method of making a nonwoven fabric according to claim 72, wherein the second kind of fiber is a cellulosic fiber.

74. A method of making a nonwoven fabric according to claim 72, wherein the second kind of fiber is selected from the group consisting of cotton fibers, rayon fibers, polypropylene fibers, acetate fibers, nylon fibers, spandex fibers, conventional polyester fibers, and biconstituent fibers.

75. A method of making a nonwoven fabric according to claim 72, wherein:
the second kind of fiber comprises either polypropylene fibers or low-melt polyester fibers; and
the step of forming the copolyester fibers into a nonwoven fabric comprises calendar bonding copolyester fibers and the second kind of fiber at a temperature of less than about 170° C.

76. A method of making a nonwoven fabric according to claim 59, wherein the step of forming the copolyester fibers into a nonwoven fabric comprises calendar bonding the copolyester fibers a temperature of less than about 210° C.

77. A method of making a nonwoven fabric according to claim 59, wherein the step of forming the copolyester fibers into a nonwoven fabric comprises employing a technique selected from the group consisting of needlepunching, hydroentangling, through-air bonding, stitch-bonding, melt spun-bonding, and melt-blowing.

78. A method of making a nonwoven fabric according to claim 59, further comprising applying a finish to the nonwoven fabric to complement its inherent wickability.

79. A method of making a nonwoven fabric according to claim 59, further comprising dyeing the nonwoven fabric at a temperature of less than about 240° F.

80. A method of making a nonwoven fabric according to claim 59, further comprising dyeing the nonwoven fabric at a temperature at or below a temperature defined by the boiling point of water at atmospheric pressure.

81. A method of making a nonwoven fabric having exceptional wicking characteristics, comprising:
copolymerizing polyethylene glycol into polyethylene terephthalate in the melt phase to form a copolyester composition;
then polymerizing the copolyester composition in the solid phase until the copolyester composition is capable of achieving a melt viscosity that facilitates the spinning of fibers;
thereafter spinning the copolyester composition into copolyester filaments;
forming the copolyester filaments into staple fibers; and
forming the copolyester staple fibers into a nonwoven fabric.

82. A method of making a nonwoven fabric according to claim 81, wherein the step of copolymerizing polyethylene glycol into polyethylene terephthalate in the melt phase yields a copolyester composition that is comprised of polymer chains formed from structural units consisting essentially of either diol monomers and aromatic non-substituted diacid monomers, or diol monomers, aromatic non-substituted diacid monomers, and branching agent monomers.

83. A method of making a nonwoven fabric according to claim 81, wherein:
the step of copolymerizing polyethylene glycol into polyethylene terephthalate in the melt phase comprises reacting in the melt phase ethylene glycol and a reactant selected from the group consisting of terephthalic acid and dimethyl terephthalate in the presence of polyethylene glycol to form a copolyester composition having an intrinsic viscosity of less than about 0.65 dl/g, wherein the weight fraction of polyethylene glycol in the resulting copolyester composition is between about 4 percent and 20 percent; and
the step of polymerizing the copolyester composition in the solid phase comprises polymerizing the copolyester composition in the solid phase until the copolyester is capable of achieving a melt viscosity of at least about 2000 poise when heated to 260° C.

84. A method of making a nonwoven fabric according to claim 81, wherein the step of copolymerizing polyethylene glycol into polyethylene terephthalate in the melt phase comprises copolymerizing polyethylene glycol and a chain branching agent into polyethylene terephthalate in the melt phase to form a copolyester composition in which the chain branching agent is present in the copolyester composition in an amount of less than about 0.0014 mole-equivalent branches per mole of standardized polymer, the standardized polymer being unmodified polyethylene terephthalate.

85. A method of making a nonwoven fabric according to claim 81, wherein:

the step of copolymerizing polyethylene glycol into polyethylene terephthalate in the melt phase comprises copolymerizing polyethylene glycol into polyethylene terephthalate in the melt phase to an intrinsic viscosity of less than about 0.65 dl/g; and the step of polymerizing the copolyester composition in the solid phase comprises further polymerizing the copolyester composition in the solid phase to an intrinsic viscosity greater than the intrinsic viscosity achieved via the melt polymerization.

86. A method of making a nonwoven fabric according to claim 81, wherein the weight fraction of polyethylene glycol in the copolyester composition and the intrinsic viscosity of the copolyester after solid state polymerization are defined by the shaded region of FIG. 1.

87. A method of making a nonwoven fabric according to claim 81, wherein the weight fraction of polyethylene glycol in the copolyester composition is between about 4 percent and 20 percent.

88. A method of making a nonwoven fabric according to claim 81, wherein the polyethylene glycol has an average molecular weight of between about 200 g/mol and 5000 g/mol.

89. A method of making a nonwoven fabric according to claim 81, wherein the polyethylene glycol has an average molecular weight of between about 300 g/mol and 1000 g/mol.

90. A method of making a nonwoven fabric according to claim 81, wherein the step of spinning the copolyester composition into filaments comprises spinning filaments having a mean tenacity of less than 3 grams per denier.

91. A method of making a nonwoven fabric according to claim 81, wherein the step of forming the copolyester fibers into a nonwoven fabric comprises forming the copolyester staple fibers and a second kind of fiber into a nonwoven fabric.

92. A method of making a nonwoven fabric according to claim 91, wherein the second kind of fiber is a cellulosic fiber.

93. A method of making a nonwoven fabric according to claim 91, wherein the second kind of fiber is selected from the group consisting of cotton fibers, rayon fibers, polypropylene fibers, acetate fibers, nylon fibers, spandex fibers, conventional polyester fibers, and biconstituent fibers.

94. A method of making a nonwoven fabric according to claim 91, wherein:

the second kind of fiber comprises either polypropylene fibers or low-melt polyester fibers; and the step of forming the copolyester fibers into a nonwoven fabric comprises calendar bonding copolyester fibers and the second kind of fiber at a temperature of less than about 170° C.

95. A method of making a nonwoven fabric according to claim 81, wherein the step of forming the copolyester fibers into a nonwoven fabric comprises calendar bonding the copolyester fibers a temperature of less than about 210° C.

96. A method of making a nonwoven fabric according to claim 81, wherein the step of forming the copolyester fibers into a nonwoven fabric comprises employing a technique selected from the group consisting of needlepunching, hydroentangling, through-air bonding, stitch-bonding, melt spun-bonding, and melt-blowing.

97. A method of making a nonwoven fabric according to claim 81, further comprising applying a finish to the nonwoven fabric to complement its inherent wickability.

98. A method of making a nonwoven fabric according to claim 81, further comprising dyeing the nonwoven fabric at a temperature of less than about 240° F.

99. A method of making a nonwoven fabric according to claim 81, further comprising dyeing the nonwoven fabric at a temperature at or below a temperature defined by the boiling point of water at atmospheric pressure.

\* \* \* \* \*

UNITED STATES PATENT AND TRADEMARK OFFICE
CERTIFICATE OF CORRECTION

PATENT NO.   : 6,582,817 B2
DATED        : June 24, 2003
INVENTOR(S)  : Carnes et al.

It is certified that error appears in the above-identified patent and that said Letters Patent is hereby corrected as shown below:

Column 28,
Line 8, after "fibers" insert -- at --.

Column 30,
Line 23, after "fibers" insert -- at --.

Signed and Sealed this

Twenty-eighth Day of October, 2003

JAMES E. ROGAN
*Director of the United States Patent and Trademark Office*